(12) United States Patent
Malnati et al.

(10) Patent No.: US 11,562,448 B2
(45) Date of Patent: Jan. 24, 2023

(54) DEVICE AND METHOD FOR PERFORMING VALIDATION AND AUTHENTICATION OF A PHYSICAL STRUCTURE OR PHYSICAL OBJECT

(71) Applicant: FIRST ADVANTAGE CORPORATION, St. Petersburg, FL (US)

(72) Inventors: Stefano Malnati, Roswell, GA (US); Ranjeev Teelock, Dallas, TX (US); Kimberle Seale, Brownsburg, IN (US); Tammie Ann Moser, Seminole, FL (US)

(73) Assignee: FIRST ADVANTAGE CORPORATION, St. Petersburg, FL (US)

( * ) Notice: Subject to any disclaimer, the term of this patent is extended or adjusted under 35 U.S.C. 154(b) by 350 days.

(21) Appl. No.: 15/138,612

(22) Filed: Apr. 26, 2016

(65) Prior Publication Data
US 2016/0314546 A1 Oct. 27, 2016

Related U.S. Application Data

(60) Provisional application No. 62/153,384, filed on Apr. 27, 2015.

(51) Int. Cl.
*G06Q 50/16* (2012.01)
*H04W 12/06* (2021.01)
(Continued)

(52) U.S. Cl.
CPC .......... *G06Q 50/163* (2013.01); *H04W 4/021* (2013.01); *H04W 4/029* (2018.02); *H04W 12/06* (2013.01)

(58) Field of Classification Search
USPC ........................................... 705/314
See application file for complete search history.

(56) References Cited

U.S. PATENT DOCUMENTS 5,857,174 A * 1/1999 Dugan .................. G06Q 30/06
705/313
6,158,284 A * 12/2000 Miller ................. E02D 29/0241
73/597

(Continued)

OTHER PUBLICATIONS

Kim-Han Thung and Paramesran Raveendran, A Survey of Image Quality Measures, Conference Paper, Jan. 2010, Dept. of Electrical Engineering, University of Malaya, Kuala Lumpur (Year: 2010).*

(Continued)

*Primary Examiner* — Sarah M Monfeldt
*Assistant Examiner* — Lance William White
(74) *Attorney, Agent, or Firm* — Oblon, McClelland, Maier & Neustadt, L.L.P.

(57) ABSTRACT

A communicating device, method, and computer readable medium for performing a process of authenticating a physical structure. The communicating device includes circuitry that is configured to transmit a first instruction to a mobile device, receive first information associated with execution of the first instruction by the mobile device, validate the first information in order to determine a first score corresponding to the first instruction, by comparing the first information with pre-stored information, transmit a second instruction to the mobile device, receive, from the mobile device, second information associated with execution of the second instruction by the mobile device, validate the second information to determine a second score corresponding to the second instruction, by comparing the second information with pre-stored information, and generate an authentication result for (Continued)

the physical structure in response to the first and second scores being greater than first and second predetermined thresholds respectively.

20 Claims, 13 Drawing Sheets

(51) Int. Cl.
*H04W 4/021* (2018.01)
*H04W 4/029* (2018.01)

(56) References Cited

U.S. PATENT DOCUMENTS

| | | | | |
|---|---|---|---|---|
| 7,657,475 B1* | 2/2010 | Arpin | G06Q 40/00 | |
| | | | 705/35 | |
| 7,873,349 B1* | 1/2011 | Smith | H04M 1/72577 | |
| | | | 455/410 | |
| 8,462,991 B1 | 6/2013 | Clements | | |
| 8,619,111 B2* | 12/2013 | Roach, Jr. | H04M 3/42 | |
| | | | 345/629 | |
| 8,718,672 B2* | 5/2014 | Xie | G01C 22/00 | |
| | | | 455/404.1 | |
| 2002/0023229 A1* | 2/2002 | Hangai | G06F 21/32 | |
| | | | 726/21 | |
| 2003/0040934 A1* | 2/2003 | Skidmore | G06Q 10/10 | |
| | | | 705/4 | |
| 2004/0230453 A1* | 11/2004 | Belmore | G06Q 10/06395 | |
| | | | 705/7.41 | |
| 2004/0260594 A1* | 12/2004 | Maddox, Jr. | G06Q 10/06 | |
| | | | 705/305 | |
| 2004/0263524 A1* | 12/2004 | Lippincott | G06T 1/20 | |
| | | | 345/541 | |
| 2005/0023347 A1 | 2/2005 | Wetzel et al. | | |
| 2006/0080132 A1* | 4/2006 | Hall | G06Q 10/06 | |
| | | | 705/4 | |
| 2006/0259392 A1* | 11/2006 | Rabenold | G06Q 10/10 | |
| | | | 705/37 | |
| 2007/0136077 A1* | 6/2007 | Hammond | G06Q 30/0278 | |
| | | | 705/306 | |
| 2008/0103991 A1* | 5/2008 | Moore | G06Q 30/0283 | |
| | | | 705/400 | |
| 2008/0123934 A1* | 5/2008 | Amidi | G05B 23/0229 | |
| | | | 382/141 | |
| 2008/0143476 A1* | 6/2008 | Kwok | G06K 19/07758 | |
| | | | 340/5.8 | |
| 2008/0263465 A1* | 10/2008 | Fox | G06F 17/30241 | |
| | | | 715/764 | |
| 2009/0076726 A1* | 3/2009 | Gemignani, Jr. | G01C 23/005 | |
| | | | 701/469 | |
| 2009/0157521 A1* | 6/2009 | Moren | G06Q 10/10 | |
| | | | 705/1.1 | |
| 2009/0174768 A1* | 7/2009 | Blackburn | G06F 16/50 | |
| | | | 348/130 | |
| 2009/0232368 A1* | 9/2009 | Niinuma | G06K 9/00107 | |
| | | | 382/124 | |
| 2009/0237245 A1 | 9/2009 | Brinton et al. | | |
| 2009/0276273 A1* | 11/2009 | McIntosh | G06Q 10/06313 | |
| | | | 705/7.23 | |
| 2010/0153168 A1* | 6/2010 | York | G06F 3/04883 | |
| | | | 705/7.36 | |
| 2010/0198940 A1* | 8/2010 | Anderson | H04N 1/00281 | |
| | | | 709/217 | |
| 2010/0303363 A1 | 12/2010 | Fedorovskaya et al. | | |
| 2011/0173104 A1* | 7/2011 | Vernon | G06Q 30/018 | |
| | | | 705/30 | |
| 2012/0023435 A1 | 1/2012 | Kneppers et al. | | |
| 2012/0098948 A1* | 4/2012 | Lee | A61B 5/1172 | |
| | | | 348/77 | |
| 2012/0151318 A1* | 6/2012 | Hays | G06Q 50/16 | |
| | | | 715/221 | |
| 2012/0254045 A1 | 10/2012 | Orfano | | |
| 2012/0310937 A1* | 12/2012 | Stibel | G06F 17/30864 | |
| | | | 707/737 | |
| 2013/0060710 A1 | 3/2013 | Preuss et al. | | |
| 2013/0090881 A1 | 4/2013 | Janardhanan et al. | | |
| 2013/0155109 A1* | 6/2013 | Schultz | G06T 11/003 | |
| | | | 345/634 | |
| 2013/0204575 A1* | 8/2013 | Pershing | G06Q 10/06 | |
| | | | 702/156 | |
| 2013/0237245 A1* | 9/2013 | Tinnakornsrisuphap | H04W 64/00 | |
| | | | 455/456.1 | |
| 2013/0330694 A1* | 12/2013 | Watterson | G09B 19/00 | |
| | | | 434/247 | |
| 2014/0100815 A1 | 4/2014 | Dubuc | | |
| 2014/0128093 A1* | 5/2014 | Das | H04W 64/006 | |
| | | | 455/456.1 | |
| 2014/0180595 A1* | 6/2014 | Brumback | A61B 5/0015 | |
| | | | 702/19 | |
| 2014/0241593 A1* | 8/2014 | Koseki | G06K 9/00221 | |
| | | | 382/118 | |
| 2014/0301645 A1* | 10/2014 | Mattila | G06K 9/00671 | |
| | | | 382/182 | |
| 2014/0350992 A1 | 11/2014 | Horton et al. | | |
| 2015/0092061 A1* | 4/2015 | Chao | G06Q 30/00 | |
| | | | 348/158 | |
| 2015/0163461 A1* | 6/2015 | Eustice | H04W 4/00 | |
| | | | 348/77 | |
| 2015/0334529 A1* | 11/2015 | Jain | H04W 4/12 | |
| | | | 455/456.6 | |
| 2015/0347857 A1* | 12/2015 | Li | G06K 9/00 | |
| | | | 382/116 | |
| 2015/0356099 A1* | 12/2015 | Targonski | G06Q 50/16 | |
| | | | 707/724 | |
| 2015/0379346 A1* | 12/2015 | Newcomer | G06K 9/00469 | |
| | | | 382/229 | |
| 2016/0223340 A1* | 8/2016 | Shin | G01C 21/206 | |
| 2016/0282230 A1* | 9/2016 | Poser | G06Q 10/06 | |

OTHER PUBLICATIONS

Pedram Mohammadi, et al, Subjective and Objective Quality Assessment of Image: A Survey, Elsevier, Jun. 28, 2014 (Year: 2014).*
Alexander Tanchenko, Visual-PSNR Measure of Image Quality, Feb. 26, 2013, J. Vis. Commun. Image R. 25 (2014) 874-878 (Year: 2014).*
Alain Horé and Djemel Ziou, Image Quality Metrics: PSNR vs. SSIM, 2010 International Conference on Pattern Recognition, 2010. (Year: 2010).*
Cao, et al., Information Capacity: A Measure of Potential Image Quality of a Digital Camera, IS&T/SPIE Electronic Imaging, 2010, SPIEDigitalLibrary.org, Jan. 18, 2010 (Year: 2010).*
International Search Report and Written Opinion dated Jul. 21, 2016 in PCT/US2016/029325.
Office Action dated Apr. 4, 2022 in Canadian Application No. 2,984,313.

* cited by examiner

DEVICE AND METHOD FOR PERFORMING VALIDATION AND AUTHENTICATION OF A PHYSICAL STRUCTURE OR PHYSICAL OBJECT

CROSS-REFERENCE TO RELATED APPLICATIONS

The present application is based upon and claims the benefit of priority under 35 U.S.C. § 120 from prior Provisional Patent Application Ser. No. 62/153,384, filed on Apr. 27, 2015, the entire contents of which are herein incorporated by reference.

FIELD

The present disclosure relates generally to the field of performing an authentication process.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Authentication processes may include credentialing or compliance validation processes. Credentialing may refer to a process of establishing the qualifications of persons, organizational members or employees, or organizations, and assessing their background and legitimacy. Credentialing may include on-site inspection(s), such as an inspection of an organization's infrastructure (for instance, an inspection of the organization's building/property) to determine whether the organization is authentic.

Compliance validation may refer to a process of establishing the adherence to policies and procedures of persons, organizational members or employees, or organizations, and assessing their diligence in complying with such policies. Compliance validation may include on-site inspection(s), such as an inspection of an organization's infrastructure (for instance, an inspection of the organization's building/property) to determine whether the organization is conforming to the established policies and procedures.

A credentialing or compliance validation process generally includes an inspector manually entering inspection information on survey form(s) and further generating a report based on the gathered inspection information. Such a technique of generating the inspection report is unreliable and inefficient, as it is prone to human errors, potential fraudulent activities, and may not include a detailed inspection of the building/site under consideration. For instance, the inspector may enter erroneous information of the building under inspection, may not be visiting the correct location and/or may not fully complete a set of tasks that are required to generate an accurate inspection report.

Organizations are generally driven by speed and simplicity, and tend to have a 'need-it-now' approach for services such as building inspections, personnel screening, compliance to policies and the like. Typically, such organizations face a cumbersome and multi-faceted process of credentialing or compliance validation via an onsite inspection. Such a process severely lengthens the amount of time and effort required in obtaining an inspection report. For instance, inspections conducted in the healthcare industry, financial organizations, onsite inspections, appraisals, and the like maintain multifaceted processes as a part of conducting business. Such organizations are burdened with manual paper-based workflows that rely on human involvement with limited capabilities in place to effectively validate the quality and accuracy of the inspection report. The inspection processes are cumbersome, time consuming, and create an elevated level of risk due to potential errors and fraudulent activities.

Accordingly, there is a need for a quick and easy to use tool that enable organizations to efficiently define the proper steps required to be performed for an authentication process, in order to execute inspection processes in a task-based and automated manner that will streamline their business, reduce their reliance on human interaction, and ultimately decrease the level of risk involved.

SUMMARY

Aspects of the present disclosure generally relate to a communicating device, a method, and a computer readable medium for performing authentication of a physical structure. The communicating device includes circuitry that is configured to transmit instructions to a mobile device via a network, receive, from the mobile device, via the network, first information associated with execution of the first instruction by the mobile device, and validate the first information to determine a first score corresponding to the first instruction, by comparing the first information with pre-stored information. The circuitry is further configured to transmit a second instruction to the mobile device via the network, receive, from the mobile device, via the network, second information associated with execution of the second instruction by the mobile device, validate the second information to determine a second score corresponding to the second instruction, by comparing the second information with pre-stored information, and generate an authentication result for the physical structure in response to the first score being greater than a first predetermined threshold and a second score being greater than a second predetermined threshold.

BRIEF DESCRIPTION OF THE DRAWINGS

Various embodiments of this disclosure that are provided as examples will be described in detail with reference to the following figures, wherein like numerals reference like elements, and wherein.

DETAILED DESCRIPTION

Figure 1:
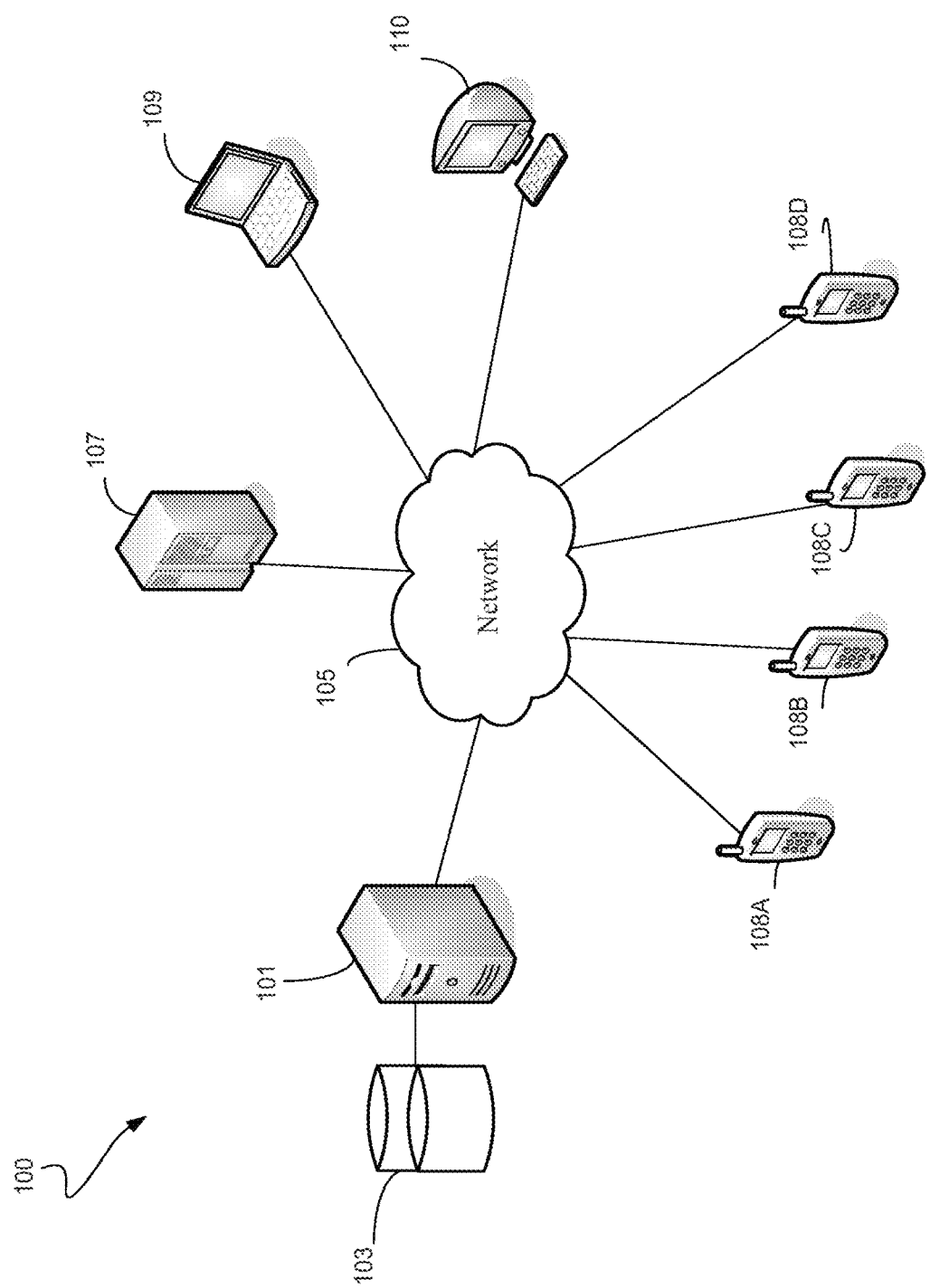
FIG. 1 illustrates an exemplary system for managing and credentialing inspections or compliance validations.

Exemplary embodiments are illustrated in the referenced figures of the drawings. It is intended that the embodiments and figures disclosed herein are to be considered illustrative rather than restrictive.

The present disclosure relates to a device and a computer implemented method thereof for performing authentication processes such as credentialing and/or compliance validation. Credentialing inspections may be defined as a process of determining the authenticity of an inspection such as an inspection of an organization's infrastructure (i.e., a building inspection), a real-estate inspection (i.e., property inspection), a healthcare/medical inspection, a financial services inspection, an auditing/appraisal, an audit/assessment aimed to determine compliance to policies and procedures and any other onsite inspection. The present disclosure provides a quick and easy to use tool that enables organizations to efficiently define the proper steps/tasks required to support credentialing process or compliance validation, and that enables the execution of the inspection in an automated task-based fashion.

A task management application is used to define the group of tasks required to support the credentialing and/or compliance validation process. A task execution application (also referred to herein as "app"), installed on a mobile device and connected to the task management application, receives the tasks and guides an inspector to complete the inspection while on-site. The task management application receives the results of each task executed by the inspector using the "app" and generates an inspection report in a seamless manner in different formats and representations used to support the credentialing and/or compliance management processes.

The method of conducting the inspection is controlled by the task management application that maintain the group of tasks required to support the credentialing and/or compliance validation process and makes the tasks available to the registered inspector, in a random order and one at a time, via a communicating device that transmits inspection instructions (i.e., tasks) to the "app" installed on a mobile device. The inspector in possession of the mobile device can view the instructions on a display panel of the mobile device via the task execution application installed thereon. Further, in the present disclosure, the terms "instruction" and "task" may be used interchangeably.

According to one embodiment, the tasks execution application receives an inspection task that is to be performed by the inspector and waits for a response from the inspector. The task result (i.e., the output of performing the task by the inspector) is obtained via data captured from a plurality of sensors or other devices disposed on or accessed by the mobile device. Further, the results are transmitted by the task execution application via the communicating device to the task management application, which then validates the results by comparing information received from the mobile device to information stored in one or more databases and other data sources. Accordingly, the task management application performs the task of credentialing the inspection by corroborating information obtained from various sensors/devices and received from the task execution application.

Turning to FIG. 1, an exemplary system 100 for managing and credentialing inspections and/or compliance validation is depicted according to an embodiment. In the illustrated embodiment, the system 100 includes a communicating device 101 coupled to memory 103. The communicating device may be a computer, a computer system resident in a facility, one or more servers that are coupled to the memory 103, or may alternatively be, or be supplemented by, one or more remote computer systems via so-called "cloud" architecture. In any case, memory 103 has stored therein a process in the form of one or more sets of instructions that is/are executable by the communicating device 101 to control and manage inspections and inspection-related data. The communicating device 101 is configured in a fashion such that the device is enabled to share information with other systems and/or devices via the World Wide Web (WWW), Internet, or any other type of network 105.

The system 100 further includes a service provider portal or gateway 107 via which users may securely access the service provider website controlled and managed by the communicating device 101. Approved users may access the portal 107 via the network 105 using, for example, a desktop, laptop, notebook, tablet or other computer and/or via a portable or handheld electronic communication device 109 that is configured to access the network 105. The memory 103 has stored therein one or more sets of instructions executable by the communicating device 101 to control and manage the service provider website wherein, the service provider website is configured to allow users to access, view, and obtain reports on inspections and account information via the service provider portal 107. Additionally, users may access the gateway 107 via the network 105 and download, from the communicating device 101, a user application (or app) on their handheld electronic devices in order to conduct an inspection or perform a compliance validation process. Furthermore, although the portal/gateway 107 in FIG. 1 is depicted to be a separate entity from the communicating device 101, the operation and functionality of the portal/gateway 107 may be incorporated within the communicating device 101.

The system 100 further includes an agent portal or gateway 110 via which approved inspectors may securely access an inspector website controlled and managed by the communicating device 101. Approved inspectors may access the portal 110 via the network 105 using, for example, a desktop, laptop, notebook, tablet, or other computer and/or via a portable or handheld electronic communication device that is configured to access the network 105. The memory 103 has stored therein one or more sets of instructions executable by the communicating device 101 to control and manage the inspector website wherein, the inspector website is configured to allow inspectors to manage inspection assignments and inspection data via the agent portal 110. The term "approved inspectors" may refer to one or more inspectors that have pre-established secure access to the portal 110, and that have been provided with corresponding access information, e.g., in the form of one or more of a user name, password, and/or the like.

The system 100 may further include one or more portable or hand-held mobile devices 108A-108D, which may be used by inspectors to conduct inspections and which is/are configured to share collected inspection data with the communicating device 101 via the network 105. The mobile devices 108A-108D may include Global Positioning Satellite (GPS) receivers and software configured to receive and process a plurality of GPS radio signals that are produced by a corresponding plurality of earth-orbiting Global Positioning Satellites. The mobile devices 108A-108D are thus configured to determine global coordinates, e.g., latitude, longitude and altitude, as well as real time information, from the radio signals produced by the satellites. Each of the mobile devices 108A-108D may include a processor and sufficient memory having stored therein one or more sets of instructions, e.g., in the form of a user application or app, executable by the processor to guide a property inspector through a property inspection.

Examples of mobile devices 108A-108D that may be used with the system 100 include, but are not be limited to, smart phones, personal communication devices (PDAs), application-specific mobile electronic devices and/or other mobile electronic devices having sufficient memory and computing power to execute a set of instructions that guide property inspectors through inspections, and configured to pass collected inspection data to the communicating device 101 via the network 105. Note that "mobile devices 108A-108D" and "mobile device 108" may be used interchangeably throughout the present disclosure.

According to one embodiment, each of the mobile devices 108A-108D includes an accelerometer, for instance an accelerometer of a linear type that has a vertical detection axis. The mobile device 108 also includes circuitry that is configured to interact with the accelerometer and determine the number of steps taken by a user who possesses the mobile device 108. The accelerometer may be an integrated sensor of semiconductor material, made using the MEMS technology. In operation, the accelerometer detects the component along the detection axis of the vertical acceleration generated during the step, and produces a corresponding acceleration signal.

Specifically, the pattern of the acceleration signal (in time) includes an acceleration profile that is repetitive in nature. For instance, the acceleration profile includes a succession of a positive phase, in which a positive acceleration peak occurs (i.e., directed upwards), due to contact and consequent impact of the foot with the ground, and a negative phase in which a negative-acceleration peak occurs (i.e., directed downwards) due to rebound. The circuitry of the mobile device, includes, for instance, a microprocessor circuit (for example, a microcontroller or DSP), that acquires at pre-set intervals, samples of the acceleration signal generated by the accelerometer and executes appropriate processing operations for counting the number of steps and measuring the distance traveled by the user.

Additionally, the mobile devices 108A-108D include an altitude sensor (altimeter) that enables the mobile device to determine the altitude at which the mobile device is positioned above a predetermined fixed level, such as sea level. Accordingly, the mobile devices 108A-108D can be configured to determine the height of an object, such as a building, by determining the difference in altitude at the base of the building and the rooftop of the building. Thus, the altimeter of the mobile device 108 can be configured to compute the number of stories in the building based on the computation of the altitude difference in a single story of the building and the total altitude difference between the top and bottom of the building.

Furthermore, the mobile devices 108A-108D may each also include a camera that is configured to take standstill (images) as well as moving pictures (video) of a desired object, and also transmit the captured video and image data to the communicating device 101, via a transmitter. Each mobile device 108 may also be configured to time-stamp the captured images and/or videos, as well as any other data, by using a built-in timer. Additionally, the mobile devices 108 may also include a temperature sensor that is configured to detect the temperature of the surrounding environment of the mobile device. For the sake of simplicity, a description of the camera, timer, and temperature sensor is omitted herein, as the functionality and operation of these devices is well known to one of ordinary skill in the art. Furthermore, each of the devices 101, 107, 108, 109, and 110 may include the configuration shown in FIG. 12.

Figure 2:
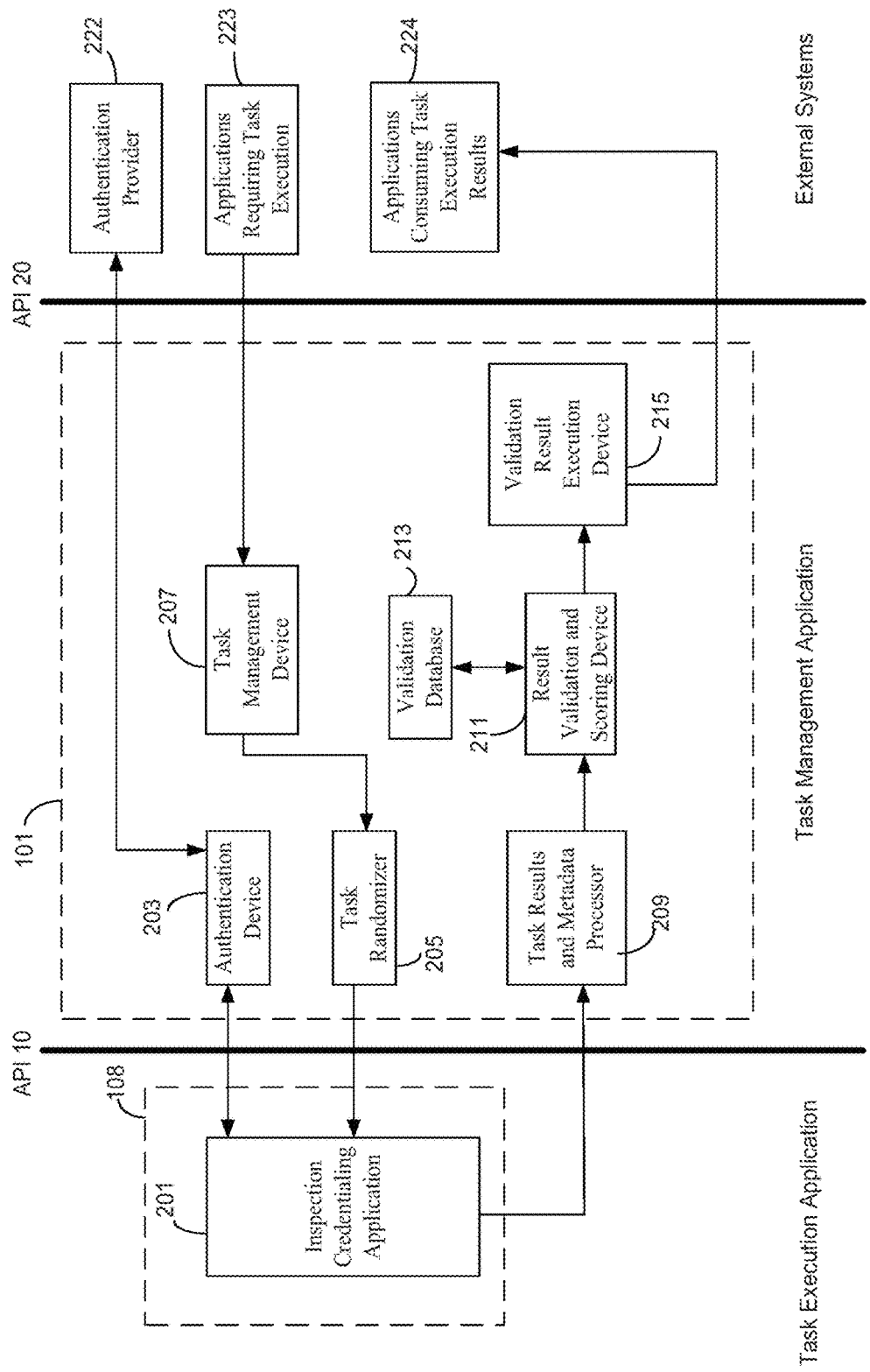
FIG. 2 depicts a block diagram illustrating components of the system used for conducting an inspection.

FIG. 2 depicts a block diagram illustrating components of the system used for conducting an inspection. The framework of the system can be divided into three portions that include a task execution application portion, a task management application portion and a plurality of external systems portion. According to one embodiment, the task management application portion may be implemented on a communicating device 101, whereas the task execution application portion is implemented on a mobile device 108. The task management application may interact with the task execution application via an application interface API 10. Furthermore, external systems may directly communicate with the task management application via another application interface API 20.

FIG. 2 illustrates the communication flow between the communicating device 101 and the mobile device 108. In FIG. 2, block 201 corresponds to an inspection credentialing application that is downloaded on the mobile device 108. The user of the mobile device 108, for instance, an inspector who conducts the inspection, receives a set of tasks from the communicating device 101, and performs each task by using a plurality of sensors, camera, and the like that are disposed on or accessed by the mobile device 108. The sensors disposed on the mobile device 108 may include motion sensors such as accelerometers, gravity sensors, gyroscopes, rotational vector sensors and the like, that are configured to detect acceleration and rotational forces. Furthermore, the mobile device may be equipped with an environmental sensors such as barometers, photometers, thermometers and the like that are configured to measure environmental parameters such as ambient air temperature and pressure, illumination, and humidity and the like. Additionally, the mobile device may also include position sensors such as orientation sensors and magnetometers that detect the physical position of the mobile device.

The inspection credentialing application 201 installed on the mobile device 108 communicates with an authentication device 203 at initial application start-up in order to authenticate, for instance, log-in credentials of the user. A set of tasks to be performed for credentialing inspections are maintained in a task management device 207. The task management device 207 communicates with a task randomizer 205 that randomly assigns a task to the credentialing application 201 installed on the mobile device 108. By implementing the task randomizer 205, the credentialing/auditing process can be automated while concealing a vetting and acceptance criteria for completing the audit.

Upon performing the tasks, the inspection credentialing application 201 transmits a response (i.e., task execution data) to a task result and metadata processor 209. According to one embodiment, the credentialing application 201 may be configured to transmit the response of each task in a sequential manner to the processor 209. Alternatively, the credentialing application 201 may also be configured to transmit, in one instance, the responses of all the tasks performed during the credentialing process. The task result and metadata processor 209 verifies if the response data obtained from the mobile device 108 is complete and ready for validation. For instance, if the task is to capture an image of a building, the metadata processor 209 may perform an initial processing of the image to determine, for instance, whether content within the acquired image is identifiable and usable.

The processed task execution data from the metadata processor 209 is transferred to a result validation and scoring device 211. The result validation and scoring device 211 collaborates with a validation database 213 to validate the execution data. For instance, if the validation data includes a plurality of street level images of a building under inspection, the result validation and scoring device 211 matches each image of the plurality of images with images stored in the validation database 213, in order to authenticate the building under inspection. According to one embodiment, the validation database 213 may be physically separated from the communicating device 101. In such an instance, the result validation and scoring device 211 may communicate with the validation database via the API 20. Additionally, the result validation and scoring device 211 may assign a score to a performed task. For instance, the score assigned to the task may be based on the degree of validation of the task. Upon performing the validation and/or scoring of each task that is executed by the mobile device 108, a validation result execution device 215 may be configured to generate, based on the validation of each task of the inspection, a final result (for example in the form of an inspection report) of the inspection process.

Furthermore, as shown in FIG. 2, the external systems may communicate with the task management application portion via API 20. For instance, the authentication device may communicate with an authentication provider 222 to obtain authentication information of a user. In a similar manner, applications that require task execution 223 may communicate with the task management device 207 in order to transmit a set of tasks that are to be performed for a particular application. Upon completion of the required tasks, the validation result execution device 215 may transfer the result of the tasks to an application consuming the task results 224. Such an application may further process the results of the performed tasks to generate, for instance, statistical reports for further analysis and the like.

Figure 3:
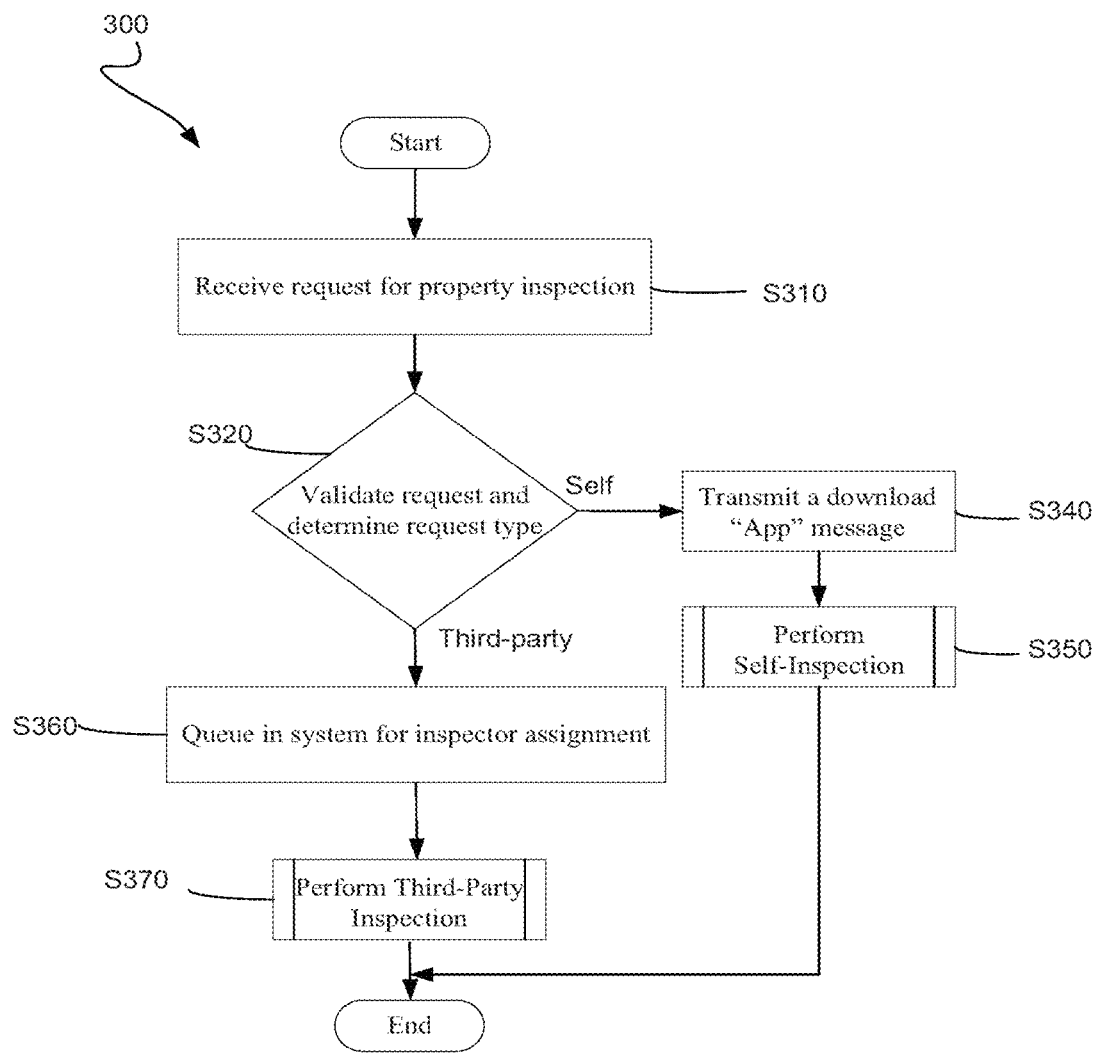
FIG. 3 depicts an exemplary flowchart illustrating the steps performed to process an inspection request.

FIG. 3 depicts a flowchart 300 illustrating the steps performed to process an inspection request, according to an embodiment. The process 300 can be illustratively stored in memory 103 of the communicating device 101, in the form of one or more sets of instructions repeatedly executable by the communicating device 101.

The process 300 commences in step S310, wherein the communicating device 101 receives a request from a user to conduct an inspection. The user can submit such a request, for instance, by completing an online inspection request form.

The data entered by the user is processed by the communicating device 101, which thereafter executes a validation process at step S320. Specifically, the communicating device checks whether the user's input data includes certain information such as a valid name, a valid address, account number, a unique user identifier and/or the like. Furthermore, the communicating device 101 processes the user's input data to determine whether the user's inspection request is a 'self-inspection' type request or a 'third-party' inspection request.

According to an embodiment, the online inspection request form may include an option requiring the user to choose from a self-inspection and a third-party inspection option. A self-inspection is a type of inspection wherein, the user intends to conduct the inspection himself/herself. Accordingly, the user submits a request to the communicating device 101 seeking permission to download the app on the user's mobile device. Note that the process of conducting the inspection can be programmed via software and executed on the user's mobile device. Further, the app installed on the mobile device may be used as a business development tool by the users. For instance, the app may be used to increase profits by leveraging business development tools contained within the app and/or accessed through the app. The user can thus increase operation efficiency, thereby reducing overhead costs.

In contrast to the 'self-inspection' type of inspection, the user may opt to select a 'third-party' type of inspection. In such an inspection, the user chooses to take advantage of services offered by a service provider to conduct inspections. Specifically, the user merely submits information, for instance, a name and address of the building he/she seeks to credentialize, and have an inspector perform the inspection on his/her behalf.

If the response to the query at step S320 is a 'self-inspection' type of inspection, the process proceeds to step S340. In step S340, the communicating device 101 transmits a message to the user's mobile device 108 instructing the user to download the inspection app. The communicating device 101 may be configured to process a payment from the user and upon successful verification, provide the user access to download the app on his/her mobile device 108. The process thereafter proceeds to step S350, wherein the user using the mobile device conducts the inspection. The details regarding the steps involved in conducting an inspection are described later with reference to FIG. 8.

If the response to the query at step S320 is a 'third-party' type of inspection, the process proceeds to step S360. In step S360, the communicating device 101 stores the request from the user and further allocates an inspector to conduct the inspection on behalf of the user. The communicating device 101 may use a plurality of scheduling algorithms to allocate an inspection task to an inspector. For instance, according to one embodiment, the communicating device 101 may allocate an inspection task to an inspector based on the address of the inspection site as well as the current locations of the inspectors. Alternatively, the communicating device 101 may use a least loaded technique to allocate inspection tasks to the inspectors. Specifically, in such an approach, an inspection task is allocated to the inspector who has the fewest number of tasks allocated thus far. Alternatively, the communicating device 101 may broadcast all inspection tasks to the mobile device 108 of each inspector, and thereafter assign the inspection task to a specific inspector who first agrees to perform the task.

The process then proceeds to step S370, wherein the inspector performs the third-party inspection by using his/her mobile device 108. Details regarding the steps involved in conducting such an inspection are described later with reference to FIG. 8. Upon conducting the inspection, the process 300 in FIG. 3 terminates.

Figure 4:
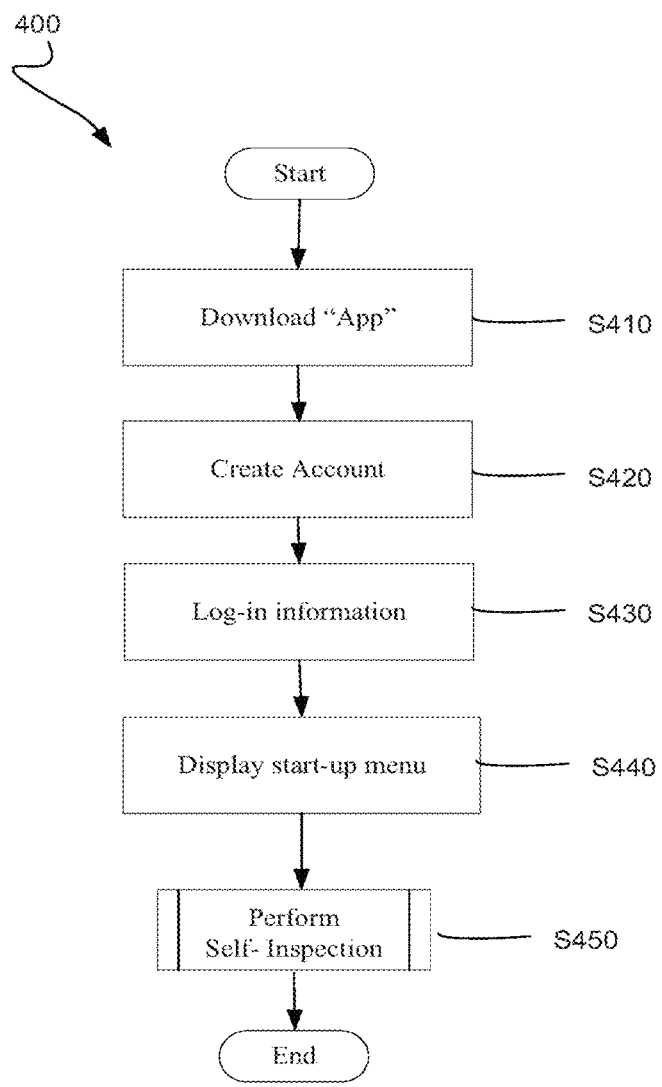
FIG. 4 depicts an exemplary flowchart illustrating the initial steps performed in conducting a self-inspection.
Figure 5:
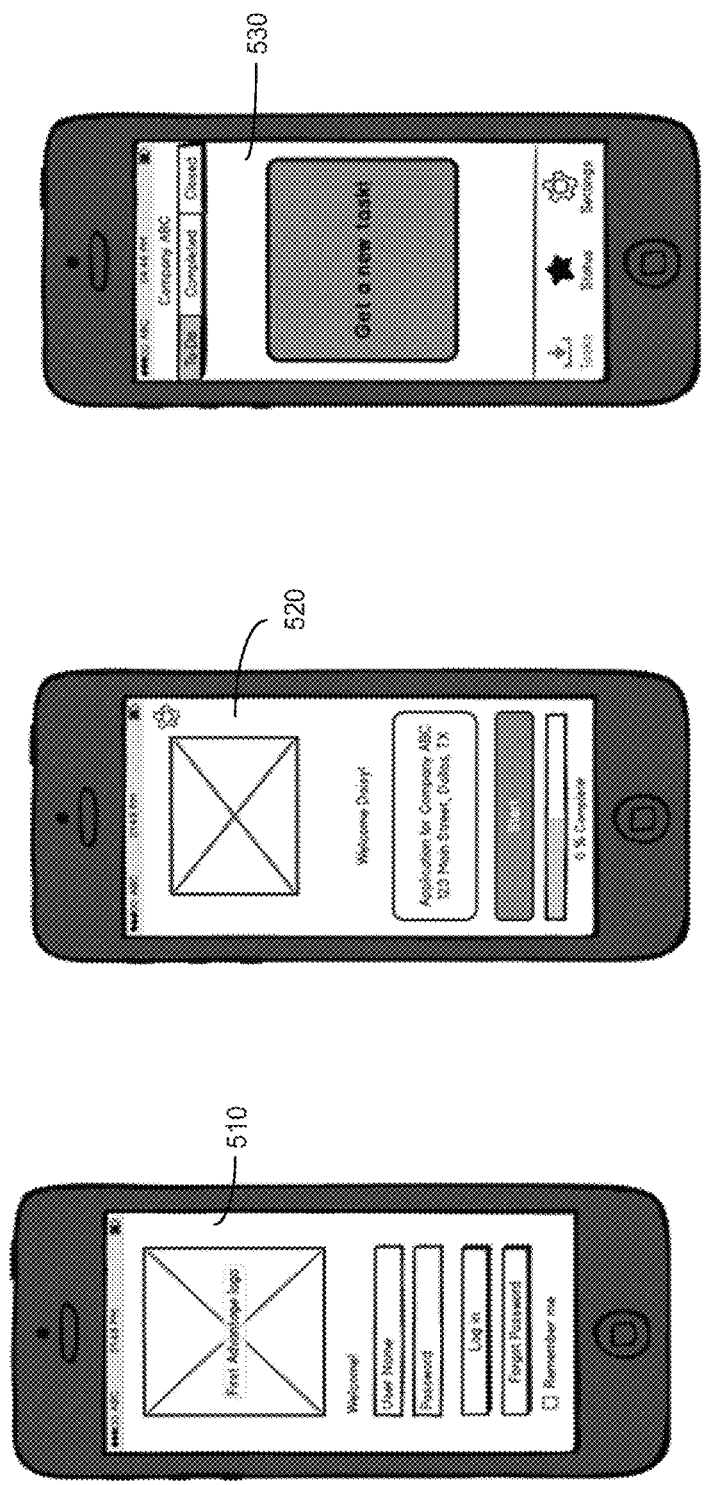
FIG. 5 depicts exemplary screenshots of a mobile device used for performing self-inspection.

FIG. 4 depicts an exemplary flowchart 400 illustrating the initial steps performed in conducting a self-inspection. The user upon submitting a request for conducting a self-inspection is notified by the communicating device 101 in step S410 to download the inspection app. The user, upon successful payment verification, downloads the inspection app in step S410. Thereafter, the process proceeds to step S420, wherein the user creates an account in the downloaded app from step S410. In step S430, the user is instructed to perform a log-in operation. For the sake of illustration, FIG. 5 depicts screenshots of the app as seen on the mobile device.

The screenshot 510 depicts an initial log-in screen wherein the user inputs a username and a password to log into the inspection app. Additionally, the display screen of the mobile device 108 may also display a logo of the company from which the user has downloaded the inspection app.

Upon performing the log-in operation, the process 400 proceeds to step S440. In step S440, a start-up menu of the inspection app is displayed on the display panel of the mobile device 108. For instance, as shown in the screenshot 520 of FIG. 5, a welcome message (including the name of the user), as well as the name of the inspection to be conducted by the user may be displayed on the display panel. For instance, in the screenshot 520 in FIG. 5, the inspection is a building inspection for company 'ABC' that is located on 123 Main street, Dallas, Tex. Additionally, a start button and a task bar that displays the percentage of inspection completed thus far may also be displayed on the mobile device 108.

Upon pressing the start button by performing a touch operation with a finger or a stylus, the process 400 in FIG. 4 proceeds to step S450. In step S450, the process of performing a self-inspection commences. As shown in FIG. 5, screenshot 530 depicts an icon labelled 'get a new task' corresponding to the credentialing inspection. Additionally, in screenshot 530, a bar including three icons labelled 'to-do list', 'completed task list', and 'closed task' is also displayed. Upon performing a touch operation on any of these icons, a list of tasks corresponding to the inspection can be displayed on the mobile device 108. Additionally, a settings icon, a status icon, and a task icon may be displayed on the bottom portion of the display panel of the mobile device 108.

The details regarding the operation of conducting a self-inspection are described later with reference to FIG. 8. Upon completing the self-inspection process, the process in FIG. 4 terminates.

Figure 6:
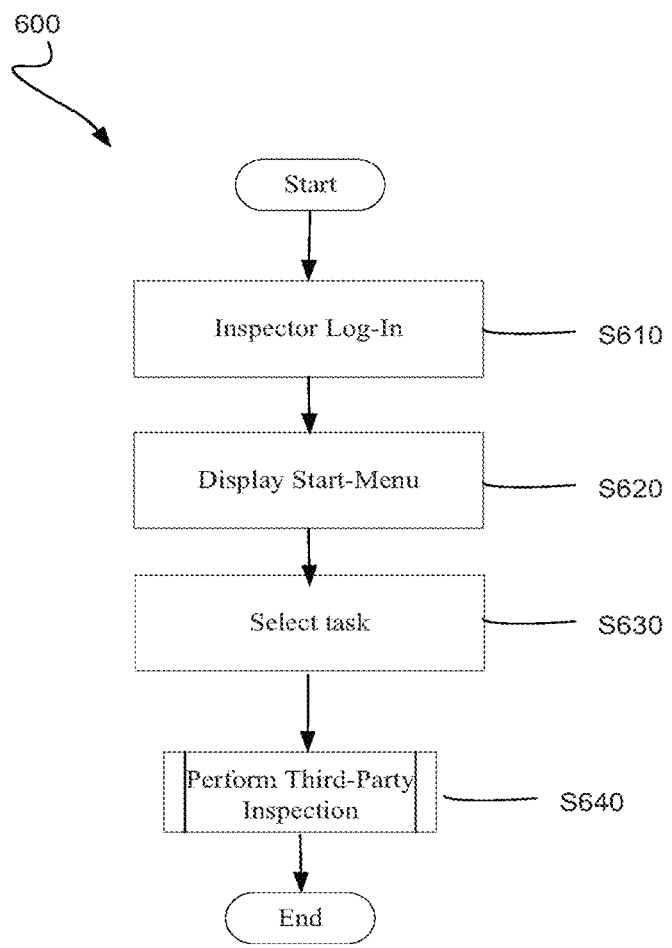
FIG. 6 depicts an exemplary flowchart illustrating the steps performed to conduct a third-party inspection.
Figure 7:
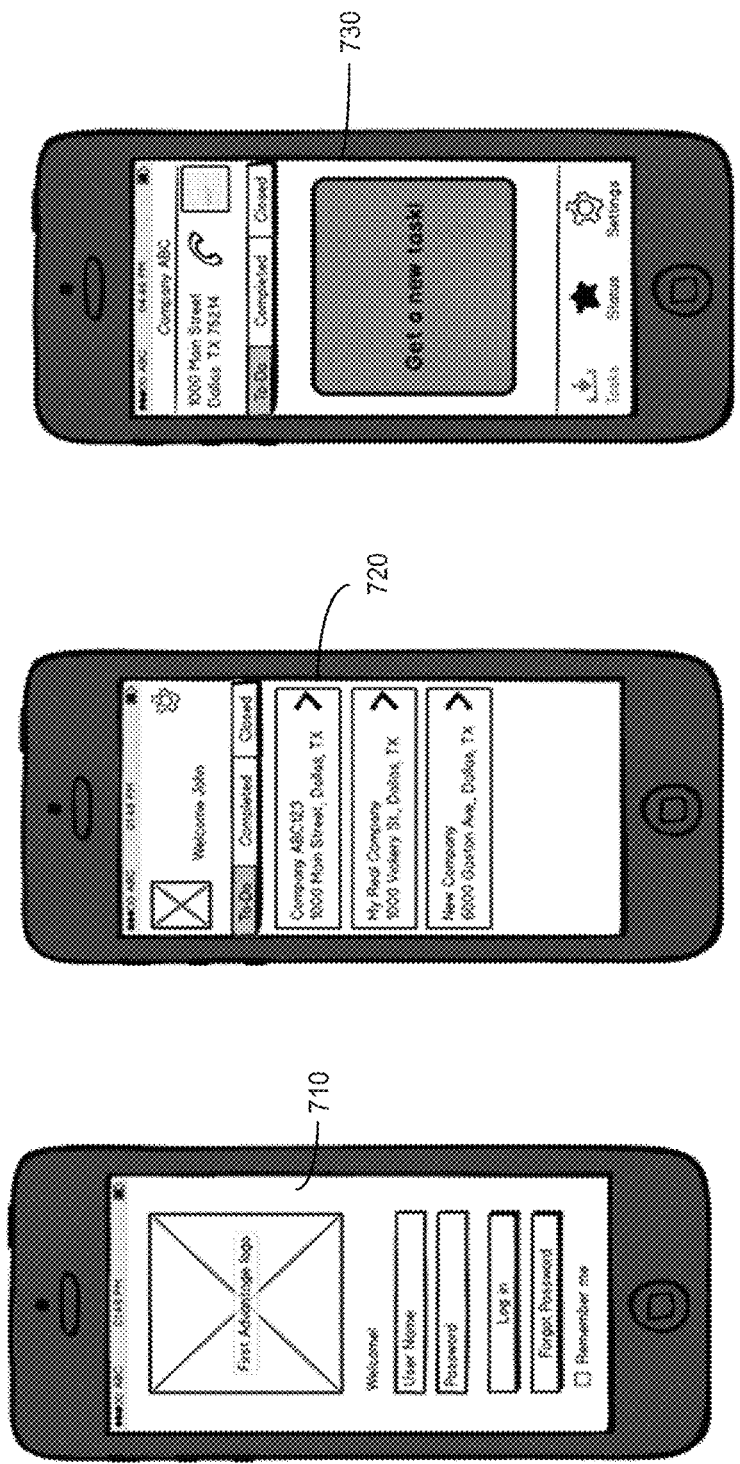
FIG. 7 depicts exemplary screenshots of the mobile device used for performing third-party inspection.

FIG. 6 depicts an exemplary flowchart 600 illustrating the initial steps performed by an inspector in conducting a third-party inspection. The process begins in step S610, wherein the inspector performs a log-in operation on the inspection app that is downloaded on his/her mobile device 108. For instance, FIG. 7 depicts screenshots of the app as seen on the mobile device of an inspector. The screenshot 710 depicts an initial log-in screen wherein the inspector inputs a username and a password to log into the inspection app. Additionally, a logo of the company that is the service provider for such inspection may also be displayed on the mobile device 108.

Upon performing a successful log-in operation, the process 600 proceeds to step S620, wherein a start-up menu is displayed on the mobile device 108 of the inspector. For instance, as shown in FIG. 7, screenshot 720 displays a welcome message along with the name of the inspector and icons representing 'to-do' inspections, 'completed' inspections, and 'closed' inspections. As shown in screenshot 720, upon performing a touch operation on any one of the icons, a corresponding list of tasks is displayed on the display panel of the mobile device 108.

The process further proceeds to step S630, wherein an inspector selects a particular inspection task (from the list depicted in screenshot 720), and commences the inspection of a particular entity. As shown in FIG. 7, screenshot 730 depicts an icon labelled 'get a new task' corresponding to the inspection of a particular business (in this example, company ABC). Additionally, in screenshot 730, a bar including three icons labelled 'to-do list', 'completed task list', and 'closed task' is also displayed. Upon performing a touch operation on any of these icons, a list of tasks corresponding to the inspection can be displayed on the mobile device 108. Additionally, a settings icon, a status icon, and a task icon may be displayed on the bottom portion of the display panel of the mobile device 108.

The details regarding the operation of conducting the third-party inspection by an inspector are described later with reference to FIG. 8. Upon completing the inspection process the process in FIG. 6 terminates.

Next, a detailed description is provided of the steps performed in conducting an inspection. It must be appreciated that the self-inspection type and the third-party inspection type of inspections are similar with regard to the tasks that are to be performed for credentialing the inspection. However, according to an embodiment, the two types of inspection techniques differ in the sense that in self-inspection, a user (self-inspector) downloads the app on his/her mobile device 108 and receives instructions in a sequential manner as to the tasks that are to be performed in order to perform the inspection. According to one embodiment, while performing self-inspection, the communicating device 101 transmits one task at a time and waits to receive a response from the user's mobile device 108 before transmitting the next task.

In contrast, in one embodiment, in the third-party type of property inspection, a trustworthy inspector is assigned the task of conducting the inspection. Accordingly, in such an aspect of credentialing, the communicating device 101 coordinates with the mobile device 108 of the inspector, and either transmits all the tasks to be performed for the inspection in a single transmission i.e., without waiting for a response of a task, or may alternatively transmit the tasks sequentially i.e., the next task to be performed is transmitted only when a response for the previous task is received. It must be appreciated that for both types of inspections (self-inspection and third-party inspection) the final results pertaining to the evaluation of the inspection are performed by the communicating device 101.

Figure 8:
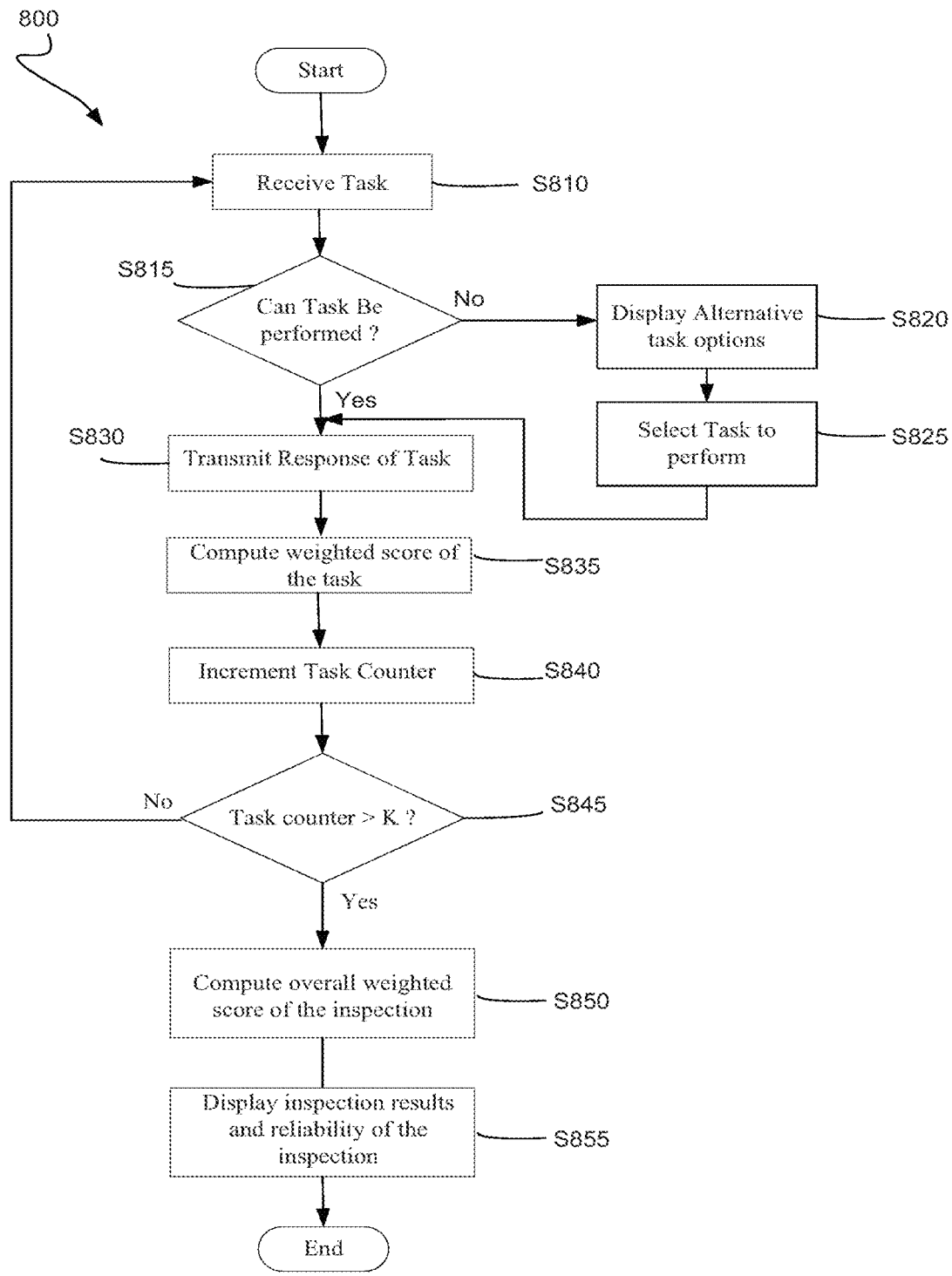
FIG. 8 illustrates an exemplary a flowchart depicting the steps performed in conducting an inspection.

A description of the steps involved in credentialing an inspection is first provided with reference to FIG. 8, followed by a description of exemplary tasks included in the inspection and their corresponding evaluation.

Figure 9:
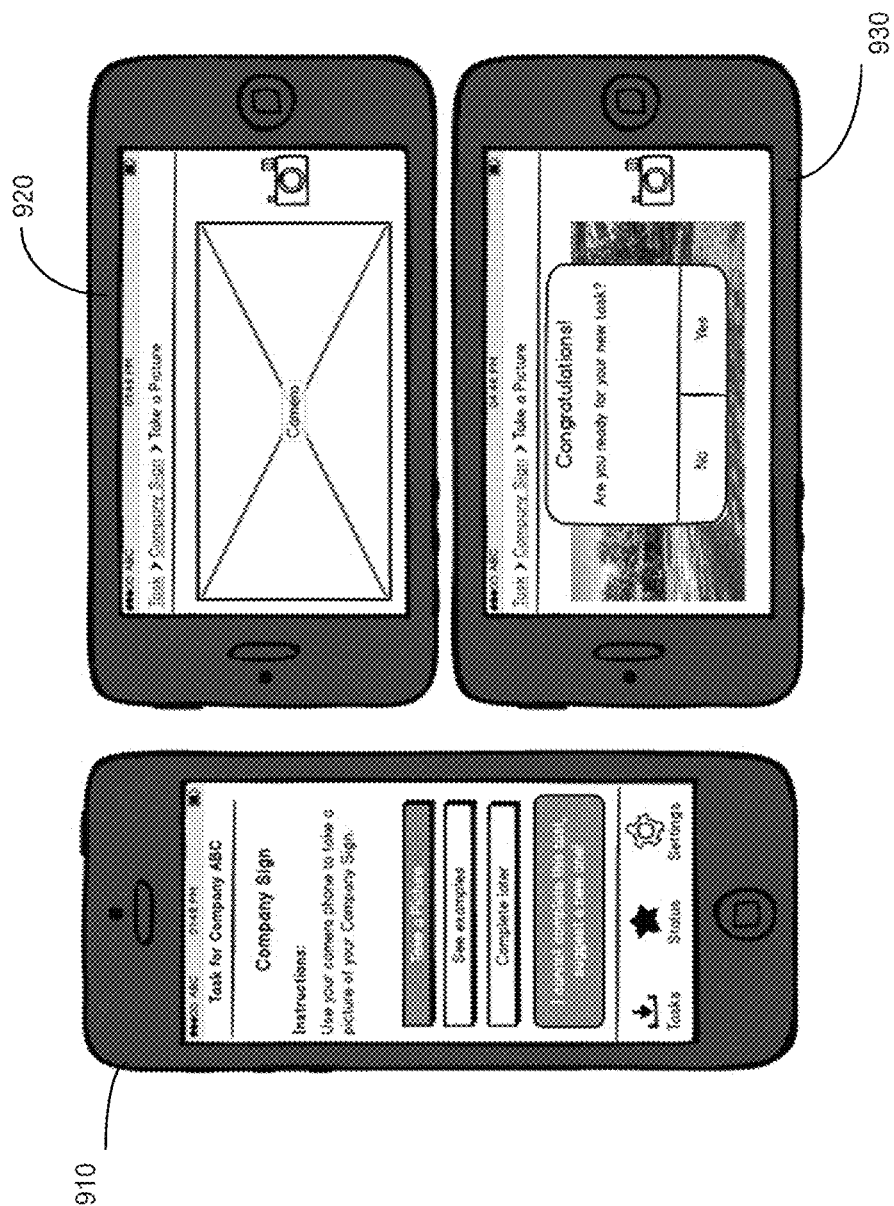
FIG. 9 depicts exemplary screenshots of the mobile device illustrating a task to be performed for inspection.

The credentialing process 800 of FIG. 8 commences in step S810, wherein a new task to be performed is displayed on the display panel of the mobile device 108. For instance, as shown in FIG. 9, the screenshot 910 of the mobile device 108 depicts a task of acquiring a picture of a company sign. Furthermore, the app also provides an icon labelled 'see examples' to view a plurality of examples depicting signs of companies acquired by previously conducted inspections.

Figure 10:
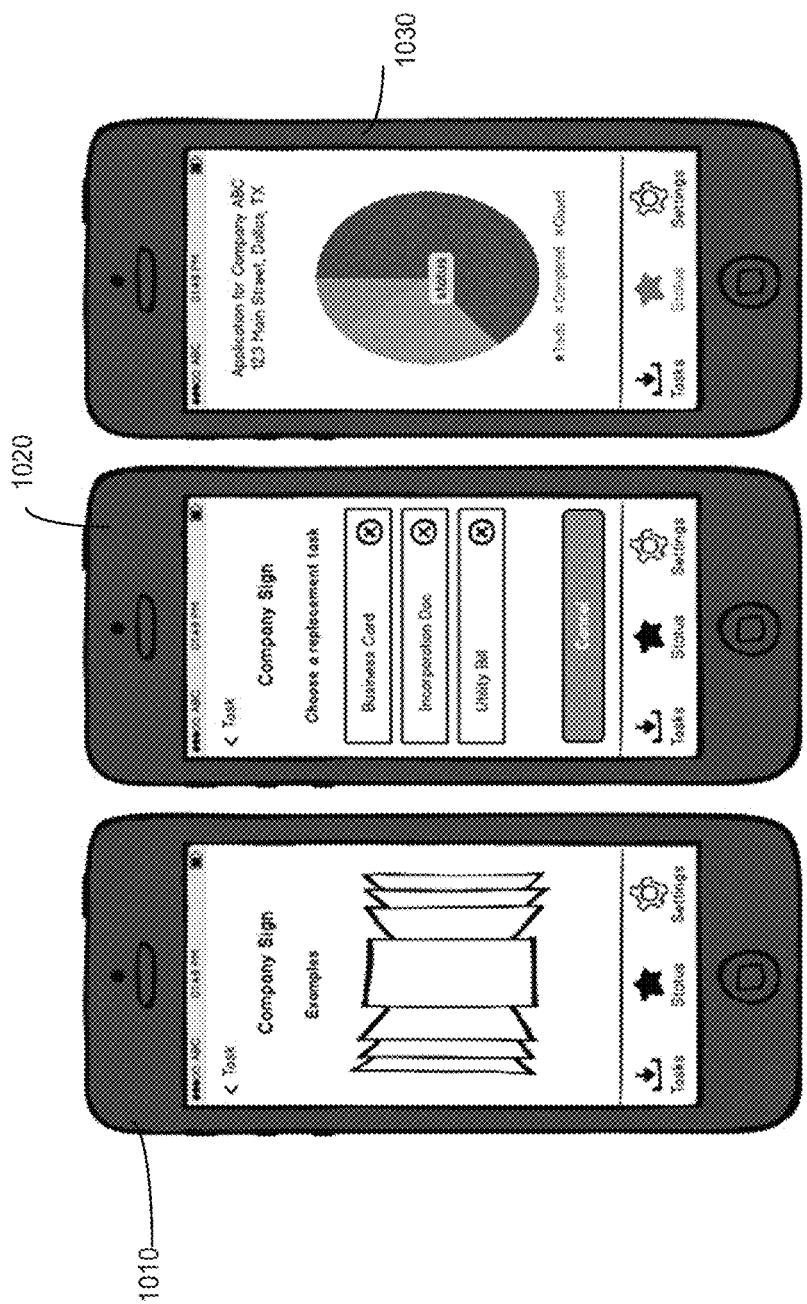
FIG. 10 depicts exemplary screenshots of the mobile device illustrating alternative options available while conducting an inspection.

Upon performing a touch operation on the 'see examples' icon, the inspector/user can view a plurality of company signs on the display panel of the mobile device 108 as shown in the screenshot 1010 of FIG. 10. Further. the screenshot 910 in FIG. 9 also displays an icon labelled 'complete later' which enables the inspector/user to perform the current task at a later time. Additionally, the mobile device 108 is also configured to display the option of not completing the current task and instead, suggesting the next task to be performed in order to proceed with the inspection process.

The process further proceeds to step S815, wherein a query is made to determine if the current task can be performed. If the response to the query is affirmative then the process proceeds to step S830 otherwise, if the response to the query is negative then the process proceeds to step S820.

In step S820, the mobile device 108 displays an alternative task to perform on the display panel. For instance, as shown in the screenshot 1020 of FIG. 10, alternatives to the task of acquiring the company sign are displayed on the display panel. Specifically, tasks such as taking a picture of the business card, a picture of the utility bill of the company, or a picture of an official company document may be displayed on the display panel of the mobile device. Further, the process in step S825 waits for a selection to be made by the inspector/user from the list of alternative tasks and then proceeds to step S830.

If the response to the query of step S815 is affirmative, the process proceeds to step S830. Specifically, if the inspector/user chooses to perform the current task (for example, taking a picture of the company sign), the camera of the mobile device 108 is activated as shown in screenshot 920 of FIG. 9. Upon completing the task, the mobile device 108 transmits the content of the completed task (the picture of the company logo in the present case) to the communicating device 101. Moreover, as shown in screenshot 930 in FIG. 9, a message is displayed on the mobile device 108 that provides a visual indication to the inspector/user of a successful completion of the current task. Further, a message indicating whether the inspector/user is ready for the next task is also displayed on the mobile device 108.

The process further proceeds to step S835, wherein the communicating device 101 computes a weighted score for task that has been performed. Specifically, for a set of tasks labelled as $T_i$ (i=1, 2, 3 . . . K), the communicating device 101 computes a score $S_i$ for the task $T_i$. According to one embodiment, the score for each task is a numeric variable distributed between a lower value $S_{i_{LOW}}$ and an upper value $S_{i_{HIGH}}$. For example, the score of task $T_1$ may be computed by the communicating device 101 to lie between $S_{1_{LOW}}=0$ and $S_{1_{HIGH}}=10$. The technique of computing the score for each task is provided later with reference to the technique of evaluating a task.

According to an embodiment, the communicating device 101 may assign each task with a weight, for instance, the weight of task i can be represented as $\alpha_i$. The communicating device 101 can categorize some tasks to be 'more important' and thus assign a higher weight, as compared to other tasks which are deemed 'less important' and thus assigned a lower weight. In step S835, the communicating device 101 computes the weighted score of the task recently performed by the inspector/user. In other words, the communicating device 101 computes the value of $\alpha_i \cdot S_i$ for task i.

The process then proceeds to step S840, wherein a value of a task counter is incremented. Note that the task counter can be initialized to a value of zero at the commencement of the inspection process. Further, the process proceeds to step S845, wherein a query is made to determine if the value of the task counter is greater than a predetermined threshold value (K). The predetermined threshold value may be determined based on the number of tasks to be performed in order to obtain an inspection report. If the response to the query in step S845 is affirmative, the process proceeds to step S850 otherwise, if the response to the query is negative, the process loops back to step S810 to perform the next task.

Additionally, the mobile device 108 may also be configured to display the status of the inspection under consideration on the display panel of the mobile device 108. For instance, as shown in FIG. 10, the screenshot 1030 depicts a pie chart illustrating the status of the current inspection. For example, the status may include a number of 'to-do' tasks that need to be completed, a list of 'completed' tasks, as well as the number of tasks that are 'closed'.

Upon conducting the K tasks for completion of the inspection, the process in step S850 computes an overall weighted score for the inspection. Specifically, according to one embodiment, the overall weighted score (OS) for the inspection can be computed as a weighted average of the scores as follows:

$$OS = \frac{\alpha_1 \cdot S_1 + \alpha_2 \cdot S_2 + \alpha_3 \cdot S_3 + \alpha_4 \cdot S_4 + \ldots \alpha_K \cdot S_K}{\alpha_1 + \alpha_2 + \alpha_3 + \ldots + \alpha_K} \quad (1)$$

Alternatively, according to an embodiment, the overall weighted score (OS) for the inspection may be computed as a normalized score based on the upper values, $S_{i_{HIGH}}$, of each tasks as follows:

$$OS = \frac{\alpha_1 \cdot S_1 + \alpha_2 \cdot S_2 + \alpha_3 \cdot S_3 + \alpha_4 \cdot S_4 + \ldots \alpha_K \cdot S_K}{S_{1_{HIGH}} + S_{2_{HIGH}} + S_{3_{HIGH}} + \ldots + S_{K_{HIGH}}} \quad (2)$$

Further, the process proceeds to step S855 wherein, the communicating device 101 controls/causes the display of the property inspection results on the mobile device 108. Additionally, according to an embodiment, the communicating device 101 may also be configured to determine (and cause to display on the mobile device) a reliability factor for each conducted inspection based on the number of tasks performed and the scores of each individual tasks. For instance, Table I depicts a total of 5 tasks ($T_1$-$T_5$) that are selected by the communicating device 101 for two inspections (Inspection I and Inspection II). As shown in Table I, tasks $T_1$, $T_3$, and $T_5$ are conducted for Inspection I, whereas tasks $T_2$ to $T_5$ are conducted for Inspection II.

TABLE I

Comparison of reliability factors for two inspections

| Tasks | $T_1$ | $T_2$ | $T_3$ | $T_4$ | $T_5$ | |
|---|---|---|---|---|---|---|
| Inspection I | ✓ | | ✓ | | ✓ | RF = 80% |
| | $S_1 = 9$ | | $S_3 = 9$ | | $S_5 = 8$ | |
| Inspection II | | ✓ | ✓ | ✓ | ✓ | RF = 40% |
| | | $S_2 = 6$ | $S_3 = 5$ | $S_4 = 4$ | $S_5 = 4$ | |

For the sake of simplicity, each task is assumed to have a score ($S_i$) that lies between a low value, $S_{i_{LOW}}=0$ and a high value $S_{i_{HIGH}}=10$. As depicted in Table I, for Inspection I, the tasks $T_1$, $T_3$, and $T_5$, have been evaluated to have a score of 9, 9, and 8, respectively, whereas for Inspection II, the tasks $T_2$ to $T_5$ have been evaluated to have a score of 6, 5, 4, and 4, respectively. According to one embodiment, the communicating device 101 may determine whether the scores of each task are above a predetermined threshold value in order to determine the reliability factor of the inspection. For instance, referring to Table I, the scores of the three tasks for Inspection I are each above 80% of the high score value $S_{i_{HIGH}}=10$. Accordingly, the reliability factor for Inspection I may be determined to be the minimum of the three scores i.e., 80%.

In contrast, for Inspection II, each of the tasks have a score that is below 60% of the high score value $S_{i_{HIGH}}=10$. Accordingly, Inspection II may be determined to have a reliability factor that corresponds to the lowest score of the four scores, i.e., 40%.

According to another embodiment, the reliability factor may be assigned based on a ratio of the total scores of the tasks to the highest possible score of the inspection. Specifically, Inspection I may be determined to have a reliability factor of 26/30, i.e., 86.66%, whereas Inspection IT may be determined to have a reliability factor of 19/40, i.e., 47.4%. Alternatively, the communicating device 101 may compute the reliability factor of an inspection taking into account the number of tasks performed as well as the overall scores of the tasks.

Specifically, the communicating device 101 may compute the reliability factor of an inspection as a weighted sum $\gamma(N)+\delta(OS)$, wherein N is the number of tasks performed for the inspection, OS is the overall score for the inspection that is computed as described above, and the parameters $\gamma$ and $\delta$ are the corresponding weights to be assigned to the number of tasks and the overall score of the inspection, respectively. Upon determining the reliability factor of the inspection in step S855, the process of conducting the inspection of FIG. 8 terminates.

It must be appreciated that even though the flowchart as depicted in FIG. 8 requires the completion of K tasks in order to generate the inspection results, several modifications to the technique of conducting inspections as described in FIG. 8 are well within the scope of the present disclosure. For instance, according to one embodiment, the communicating device 101 may cease to transmit a new task for conducting the inspection operation based on scores of all previously assigned tasks being greater than a predetermined threshold. For instance, if the scores of a first predetermined number of tasks (for example, the first three tasks out of a total of ten tasks) is greater than a certain threshold, the communicating device 101 may conclude that the inspection is accurate and stop the inspection process by not transmitting any new tasks to the mobile device 108.

Furthermore, the thresholds for the individual tasks may be similar or distinct from one another. For instance, consider that the tasks of capturing an organization's logo and determining the square footage area of the organization's infrastructure are to be performed in the credentialing process. Furthermore, for the sake of simplicity, assume that the above tasks are evaluated by the communicating device 101 to have a score that lies between $S_{i_{LOW}}=0$ and a high value $S_{i_{HIGH}}=10$. According to one embodiment, the task of capturing the organization's logo may be deemed more important that determining the square footage area of the organization's infrastructure. Accordingly, the communicating device 101 may set the first threshold corresponding to the task of capturing the organization's logo to have a value of 7, whereas a second threshold corresponding to the task of determining the square footage area of the organization's infrastructure may be set to have a value of 5. However, in one embodiment, although the tasks may be different, both of the tasks may have the same threshold value (for example, a value of 7).

Additionally, according to one embodiment, the communicating device 101, upon receiving a response for the task performed by the mobile device 108, initially determines if the content of the response is feasible for further processing. If the content is deemed not to be feasible for further processing, the communicating device 101 may transmit the same task back to the mobile device 108. Alternatively, the communicating device 101 may choose to transmit a modified version of the task to the mobile device with an anticipation of receiving a response that can be further processed.

For example, consider that the task submitted to the mobile device 108 is one of capturing an image of a building that is being inspected and/or capturing a logo of the organization being credentialized. If the image transmitted by the mobile device 108 is corrupted or the content in the image is not recognizable, the communicating device 101 may discard the image received from the mobile device 108 and re-transmit the same task back to the mobile device 108. The communicating device 101 may also transmit a modified version of the task to the mobile device 108. For example, if the content of the captured image of the building or logo or the organization is degraded (i.e., the quality of the captured image is below a predetermined quality threshold), the communicating device 101 may transmit a task instructing the inspector to capture images from different angles of the property that is being inspected.

Next, according to an embodiment, several techniques used by the communicating device 101 to evaluate a specific task and determine a corresponding score for the task are described. For sake of convenience, the evaluation of specific tasks corresponding to an inspection of a company's infrastructure (such as a building) is considered. As previously described, a task to inspect the building may require, for example, the inspector/user to capture an image of the company sign (logo). The logo captured by the mobile device 108 is transmitted as an image to the communicating device 101. The communicating device 101 scans the received image and uses image pattern matching techniques to determine a similarity between the received image and images stored in a database. For instance, the communicating device 101 may attempt to match the logo of the company to several logos previously collected and stored in a database associated with the communicating device 101.

Alternatively, the communicating device 101 can access the Internet to obtain a plurality of logos of various organizations and attempt to find a match thereof. According to an embodiment, the communicating device 101 may assign a score based on the outcome of the matching. Specifically, based on the degree of similarity between the captured logo and the images saved in the database associated with the communicating device 101, the communicating device 101 may assign a relatively high score if there is a high degree of similarity between the captured logo and an image stored in the database. In contrast, if the captured logo does not match (or only portions of the captured logo match) an image in the database, the communicating device 101 may assign a low score for the task. Furthermore, the memory associated with the communicating device 101 may store information pertaining to logos and street level images of different organizations, public/government records of various organizations, and the like.

According to one embodiment, an inspection task may request an inspector/user to capture street level images of the building under inspection. Accordingly, upon capturing (and further transmitting to the communicating device 101) the street level images of the building under consideration, the communicating device 101 may utilize computer vision techniques to determine the content of each captured image. Further, the communicating device 101 may attempt to match the content of each image of the captured images to a set of street level images obtained, for instance, via Google images or any other type of street level images.

The street level images of the building under inspection can be obtained via Google images based on an initial address of the property, a GPS location of the mobile device 108, and other similar techniques. Upon a successful match of the captured street level images, the communicating device 101 may assign a high score to the inspection task. In contrast, when there is no similarity between the set of images captured via the mobile device 108 and the street level images obtained for instance, via the Google software, the communicating device 101 may assign a low score to the inspection task.

According to one embodiment, an inspection task may require the inspector to walk (with the mobile device 108) around the perimeter of the building under inspection. An accelerometer sensor disposed on the mobile device 108 may capture the number of footsteps taken by the inspector/user and further estimate based on an average footstep size of the inspector/user, a square footage area of the building under inspection. For instance, the mobile device 108 may trace a trajectory of the inspector/user as he/she walks around the building and based on the trajectory and distance traveled by the inspector/user, the area of the building may be estimated.

Further, upon transmitting this data to the communicating device 101, the communicating device 101 may obtain a satellite image of the building under inspection and determine from the obtained satellite image, an estimate of the square-footage area of the building. Note that the square footage area of the building under inspection can be estimated from the satellite image based on a scale of the satellite image and a surface area of the roof (of the building under consideration) as captured in the image. Based on a similarity between the square footage area computed via information obtained from the accelerometer sensors and the square footage area of the building obtained from the satellite image, the communicating device 101 may determine an appropriate score for the task.

Certain tasks may be assigned by the communicating device 101 in order to prevent fraudulent business listings. Such tasks may require the inspector/user to perform physical activities such as walking around the perimeter of the building as described above. Moreover, according to an embodiment, the inspector may be required to transmit a measurement obtained via the altitude sensor disposed on the mobile device 108, when the inspector/user is located at the entrance (i.e., ground floor) of the building under inspection. Further, the inspector/user may be instructed to use a stairwell or elevator to reach the roof top of the building under inspection.

A measurement obtained via the altitude sensor may be transmitted when the inspector/user is located on the roof of the building. Based on the difference of the two altitude measurements, as well as the difference between the altitude measurements between the ground floor and a first floor, the number of stories (floors) of the building under inspection can be computed. Furthermore, the computed number of stories of the building can be matched to an image of the building acquired for instance, from the street, wherein the image captures the entire building. Accordingly, by previously described mechanisms, a score may be assigned to this task.

Furthermore, the accelerometer can be used in combination with the camera of the mobile device 108 to capture a video of the inspector/user walking inside the building or a particular office. Upon transmitting the video to the communicating device 101, a determination can be made as to whether the video has been tampered with. Such a determination can be made for instance by video forgery detection techniques as known to one of ordinary skill in the art. Based on the degree of video tampering, a score may be assigned to the video capturing task.

According to one embodiment, the communicating device 101 may identify businesses that are located in the vicinity of the building under inspection and that have been previously inspected. The communicating device 101 can identify such businesses by using the address of the building under inspection and/or a GPS location of the mobile device 108. Further, the communicating device 101 can generate a list of such businesses and also include established landmarks that lie within the region.

Further, the inspector/user may be instructed to walk, starting from the property under inspection, to at least one of the previously inspected businesses and/or landmarks. In doing so, the communicating device 101 can obtain via the accelerometer disposed on the mobile device 108, a count of the number of steps taken by the inspector/user as well as the distance traveled by the inspector/user. The distance traveled by the inspector can be verified by the communicating device 101 by using, for instance, Google maps or any other type of web mapping application. Based on the degree of similarity in the matching, the communicating device 101 may assign a score to the task as described previously.

According to one embodiment, in order to ensure that the tasks provided by the communicating device 101 are being timely performed by the inspector/user, the communicating device 101 can establish mechanisms to check the authenticity of the performed tasks. In other words, the communicating device 101 may require that the inspector/user perform a certain task at a certain time (or within a certain time-frame) of the day. Accordingly, in order to ensure that the tasks are not being performed in a fraudulent manner, the time the images/videos/data were captured or collected is cross-checked by the communicating device 101 with the requested time frame.

The communicating device 101 may also require, for each of the above described embodiments, a temperature sensor to detect (and transmit) the temperature of the environment wherein the inspector is conducting the inspection. Upon receiving the temperature for each task performed by the inspector, the communicating device 101 can cross check the received temperature with a temperature of the location of the inspector/user obtained from local weather authorities, the Internet, and the like. Accordingly, the communicating device 101 can maintain authenticity for the tasks performed in conducting the property inspection.

It must be appreciated that the above described embodiments are to be considered illustrative rather than restrictive. A specific property inspection may entail some, all, or a combination thereof of the above described tasks in conducting an inspection. Furthermore, although the concepts disclosed above have been described in connection to conducting a business/building inspection, the concepts are equally applicable for instance, to conduct personnel screening for employment purposes.

For instance, large and medium sized businesses frequently hire people. Such businesses often require that a background check be performed on the person to be hired before the employment commences. Such a mechanism of credentialing individuals can be performed, for instance, in the self-inspection mode. Specifically, an app downloaded on a mobile device 108 can be configured to capture an image of the person, and obtain personal information pertaining to the person's height, complexion, weight, and the like.

In addition, a biometric sensor disposed on the mobile device 108 may be configured to obtain a fingerprint scan and/or a retina scan of the person. Further, the person's voice may be recorded for a predetermined time via a microphone disposed on the mobile device 108. All or some of the above captured information may be transmitted to a communicating device 101, which may use image matching techniques to find a match of the person's image, use the Internet to obtain information about the person, cross-check the obtained information with governmental agencies or public records and the like, to detect any criminal or fraudulent activities. Such verified information may enable the organization to make a decision regarding the hiring of the person.

Additionally, certain organizations are frequently required to manage compliance risks associated with independent work personnel (e.g., contractors) that are hired for a particular job. In such a scenario, the organization can improve its compliance efforts by requiring the potentially hired personnel to conduct a set of tasks related to the personnel's business and capabilities. Further, the credentialing system may also form a bridge between the work personnel and a client (i.e., a person interested in hiring the personnel). Specifically, the client may provide feedback of the job performed by the personnel. Such feedback may include contextual evidence (in the form of a video, picture, comments etc.) related to the work conducted by the personnel.

Furthermore, the feedback obtained from different clients may be aggregated to develop a compliance database that includes the performance of various work personnel. Such a database may aid new/existing clients in determining which personnel should be hired. Additionally, the compliance and credentialing processes may be delivered directly to a client's mobile device via an application interface to the communicating device. For instance, consider the 'UBER' mobile application that can interface with a compliance engine, which instructs the driver to perform certain tasks (e.g. take a picture of the car interior, the latest driver license, provide an electronic signature, provide a current date, provide a textual answer to a question, provide a phone number that may be validated by an SMS message. and the like). Such credentialing tasks may ensure the most up to date conformance to compliance policies.

According to one embodiment, the credentialing process may interact with a crowd sourced community of validated education providers (for instance, students living on campus) in order to deliver education verification documents/records. Similarly, the credentialing processes described above may interact with a group of court runners (e.g., personnel working in judicial courts) in order to deliver search results from public records searches that are to be performed at various court locations.

The above discussed credentialing techniques may also be used in a job-credit 'follow-up' scenario. Specifically, job-credit systems perform regular "follow-up" activities, mostly targeted to clients' location-level, regional, or corporate managers and human-resources staff. The follow-up outreach is designed to obtain critical documents necessary to substantiate tax credits. The credentialing techniques described herein may be used to obtain the 'follow-up' items that are usually sought, such as copies of driver's license for proof of age or address, tax related forms and documents, DD-214 form authentication for veterans, etc. Additionally, tasks such as "take a photograph" can also be used in validating the data for each client.

Businesses such as driver qualification businesses also rely on obtaining compliance information/documents. Similar to the job-credit system, an outreach program is generally employed to obtain information pertaining to expired driver documentation as well as to transmit alert messages for pending expirations/renewals. The credentialing techniques discussed above may be installed in a lightweight desktop and web based compliance widget that is designed specifically for such purposes. Such a capability may aid a location manager to work through all out-of-compliance or expiring documents. Furthermore, such capabilities may be converted into a set of tasks that are sent to the proper users for completion.

In addition, the credentialing and/or compliance techniques discussed above may be used in a fleet-compliance industry. Specifically, the techniques can be used for managing licensing for trucking industry assets. In such an industry, information related to vehicle registrations, vehicle tags and the like carry expirations. Accordingly, location managers can be informed of upcoming renewals, obtain trip logs from clients and perform data entry/calculations on any highway usage taxes and the like.

Furthermore, in any of the above-discussed processes, the communicating device 101 may request/instruct an inspector/user to capture (using the mobile device 108) an image of a valid, government issued identification (ID) (such as, a driver's license or passport) or any other type of official ID. The communicating device 101 may request this at any time during the credentialing process (for example, as a first step before issuing any other task, after some steps have been performed, or at the end when all other tasks have been completed). Such information may serve as an extra blanket of security to ensure the true identity or the inspector/user.

As with any of the other collected data, the image of the ID may be compared by the communicating device 101 with pre-stored data/information to confirm the validity of the ID. Moreover, the image of the ID may serve as a record of the inspector/user who performed the credentialing. Such record may also be useful in keeping track of how many different businesses/organizations were credentialized by the same person, and also what the credentialing results or scores were for each business/organization. For example, a low score in each credentialing process performed by a certain person may raise suspicion that this person is attempting to commit deception or fraud.

In one embodiment, upon completion of the tasks pertaining to the credentialing process, the communicating device 101 may transmit the results of the credentialing process, via a network, to the organization that requested the credentialing process. The organization may further analyze the credentialing results based on the organization's policies, and utilize the credentialing results as a business development tool. For instance, consider the scenario in which an organization, which provides hardware installment services of various kinds in homes and business locations, has requested a credentialing process of the employees (i.e., installers). Upon receiving the credentialing results from the communicating device, the organization may evaluate the results to generate a quality score for each installer. Furthermore, based on the credentialing results, the organization may further determine necessary steps that need to be taken to improve the work quality of the installers.

Additionally, in one embodiment, based on the type of credentialing/compliance validation process being performed, the communicating device 101 may transmit the results of the credentialing/compliance validation process to the mobile device of the user that performed the credentialing/compliance validation process. For instance, consider the case in which an organization's human resource director is assigned a task of performing compliance validation of the employees of the organization. The director may install the compliance validation 'app' on his/her mobile device in order to execute the tasks pertaining to the compliance validation process of the employees. Upon completion of the tasks, the communicating device may generate a report that includes the results of the compliance validation of all the employees and transmit the report to the mobile device of the director. In doing so, the director may further analyze the report of the compliance validation to ensure that each employee abides by the policies of the organization and further determine if any action(s) is required to be enforced for a particular employee based on his/her compliance validation result.

Accordingly, the credentialing techniques described herein may also be used as a quality control measure. For instance, consider a facility such as a finger printing laboratory that may be visited by several clients. The clients may download the credential 'app' on their respective mobile devices and obtain pictures of the facility. For instance, the clients may capture images depicting the state of the equipment used at the facility, a cleanliness of the facility, and the like. The captured images upon being transmitted to the communication device may be further inspected (e.g., in a visual manner) for authentication purposes so as to make accurate deductions of the particular facility.

In one embodiment, implementing the authentication process on the communication device provides the present disclosure the advantageous ability of ensuring that the generated authentication report (corresponding to an authentication process) is genuine. Specifically, the communication device upon receiving information associated with the transmitted tasks (pertaining to the inspection), can process the information in an efficient manner to ensure that the information has not been tampered with and/or determine if the information was acquired in a fraudulent manner. For instance, consider the task of capturing a logo of an organization. The communication device upon receiving an acquired logo (from the mobile device) may compare the logo with a database and generate a degree of matching of the acquired logo with a logo stored in a database. It must be appreciated that the degree of matching of the acquired logo can be obtained in a time efficient manner, which is not possible if the above task were to be conducted manually. Furthermore, as stated previously, the communication device may terminate the authentication process based on the generated scores for the prior tasks being above a predetermined threshold. Such a feature provides the present disclosure the advantageous ability of improving the functioning of the communication device (processing machine). For instance, consider that a particular authentication process includes a plurality of tasks that are to be performed in order to generate the authentication report. In such a scenario, rather than performing all the tasks in a sequential manner and thereafter generating the report (only after the completion of all the tasks), the present disclosure may terminate the authentication process based on the results of, for instance, the first two tasks being above a certain threshold. In doing so, the embodiments discussed above provide the advantageous feature of saving processing time (and power), as well as evaluating the scores for each task in a robust manner.

One embodiment of the present disclosure provides a task map service (TMS). The TMS is a mapping service that utilizes maps such as Google maps, Google maps API, and the like to generate further detailed information about location(s) associated to a particular task that is being performed by the credentialing or compliance validation processes of the present disclosure.

Specifically, TMS provides a visualization of geographic information (pertaining to the site/location under inspection) in order to enhance a decision making process associated with the interpretation of the result of the credentialing process. A goal of the TMS is to generate a visualization that provides a further level of validation of the credentialing process. Specifically, the goal of the TMS is to generate a geographical visualization that maximizes accuracy (defined herein as a tendency of measurements that are reported by the mobile device agreeing with the actual true values) of the results provided by the mobile device that are used for validation purposes.

According to an embodiment, TMS may be implemented by circuitry in the communicating device 101 of FIG. 1. The TMS obtains an initial location (address) of the property to be inspected. For instance, the initial location may be a company address (as shown in 520 of FIG. 5) that is transmitted to the mobile device. Furthermore, TMS also receives data from the mobile device that pertains to the location where inspection is being conducted. For instance, the mobile device may transmit data pertaining to a latitude, longitude, and altitude, of the location being inspected.

The mobile device while reporting data to the communication device 101 may also provide accuracy information of the data. The accuracy of the coordinates that are reported by the mobile device are dependent on the type of mobile device and GPS instrument used, satellite settings, amount of time invested in establishing and stabilizing GPS connection, and type of area (i.e., urban, rural etc.) where the inspection is being performed. For example, a location under inspection that is surrounded by high buildings may have a weak GPS signal strength, which affects the accuracy of the reported GPS coordinates.

Figure 11A:
FIG. 11A illustrates an exemplary screenshot of a geographic location including a confidence zone.

According to an embodiment, the accuracy reported by the mobile device may be in the form of an error range around the true location. Thus, as shown in FIG. 11A, the TMS generates a zone of confidence 1101 around the location being inspected. Furthermore, as shown in FIG. 11A, TMS also depicts the positions (depicted as drop-pins 1103) that are associated with the location under inspection, where certain validation tasks may have been performed. As will be described next with reference to FIG. 11B, since the positions lie within a computed geometrical distance (i.e., the positions lie within the zone of confidence), it can be concluded that the inspection tasks performed at the respective positions relate to the same location.

Figure 11B:
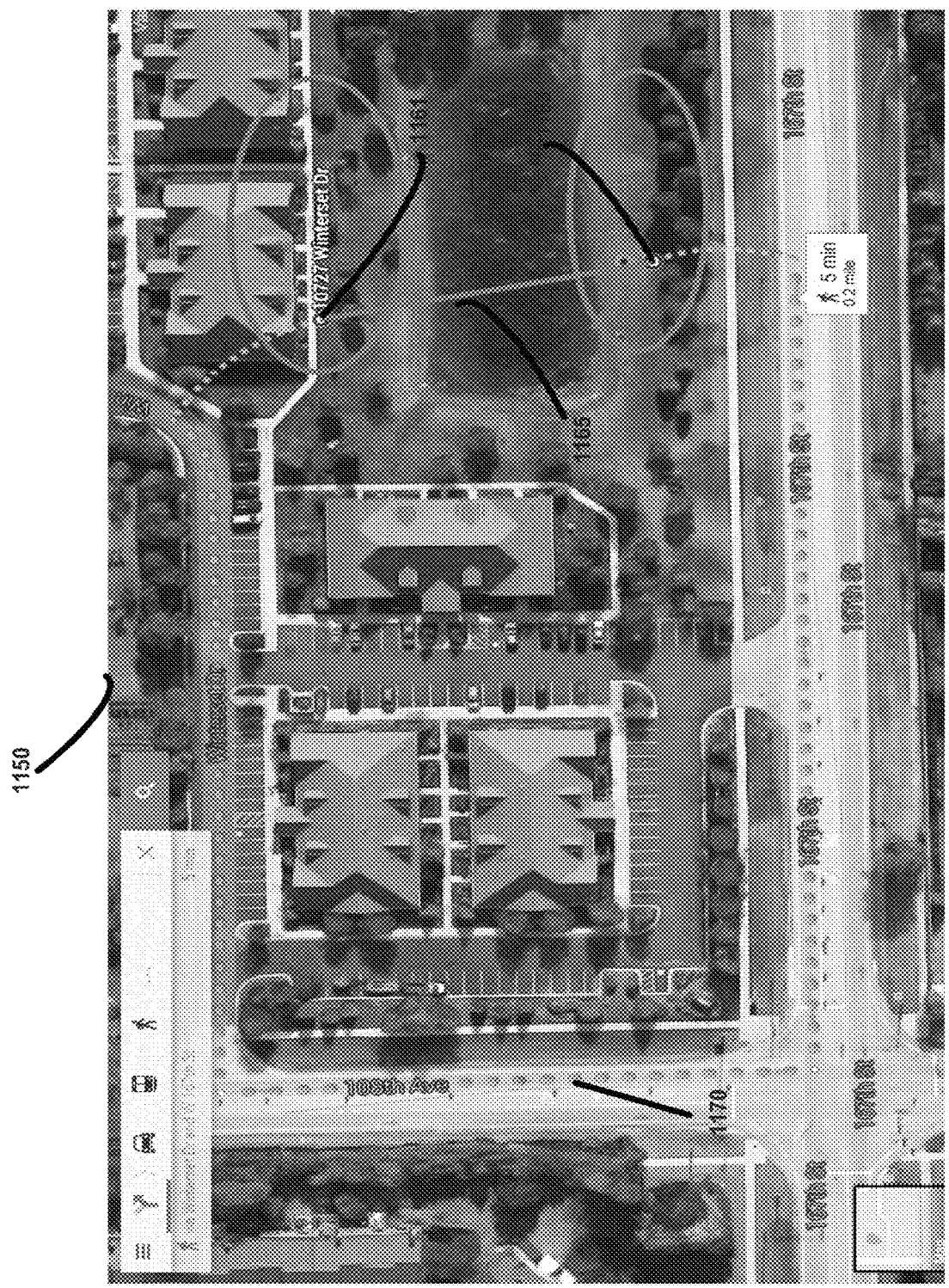
FIG. 11B depicts a task mapping service for a geographical location according to an embodiment.

FIG. 11B depicts, according to an embodiment, a snapshot 1150 of the task mapping service for a geographical location 1161. TMS depicts the address of the location ('10727 Winterset Dr') 1161 that is being inspected. Additionally, the TMS also depicts a position 1163 that may correspond to a position where a certain task associated with the location 1161 may be performed by the mobile device. Note that the distance to traverse from location 1163 to location 1161 as shown by the Google API is the distance along the dotted line 1170.

For instance, as shown in FIG. 11B, the distance from location 1163 to 1161 is 0.2 miles with an estimated walk-time of 5 minutes. Therefore, utilizing the Google API distance for validation purposes of an inspection may lead to faulty interpretations. Specifically, the communicating device upon receiving notifications from the mobile device pertaining to the inspected positions (1161 and 1163) may determine that the two locations of inspections are not associated with the same address, due to a significantly large distance being traveled between the inspections.

In order to overcome this drawback of using the Google API distance to interpret inspections, in one embodiment of the present disclosure, the TMS computes a geometrical distance 1165 between the two positions (1161 and 1163) of inspection. Based on the magnitude of the computed geometrical distance, the TMS may employ a certain threshold to make accurate inspection interpretations. Specifically, in one embodiment, the TMS may employ a threshold distance and compare the geometrical distance to the threshold. Based on the computed geometrical distance being lower that the threshold, TMS may accurately determine that the inspection positions 1161 and 1163, respectively, are in fact associated with the same inspection. In this manner, TMS provides the advantageous ability of providing an added layer of validation for the credentialing or compliance validation processes of the present disclosure.

Each of the functions of the described embodiments may be implemented by one or more processing circuits. A processing circuit includes a programmed processor (for example, processor 1203 in FIG. 12), as a processor includes circuitry. A processing circuit also includes devices such as an application-specific integrated circuit (ASIC) and conventional circuit components arranged to perform the recited functions.

Figure 12:
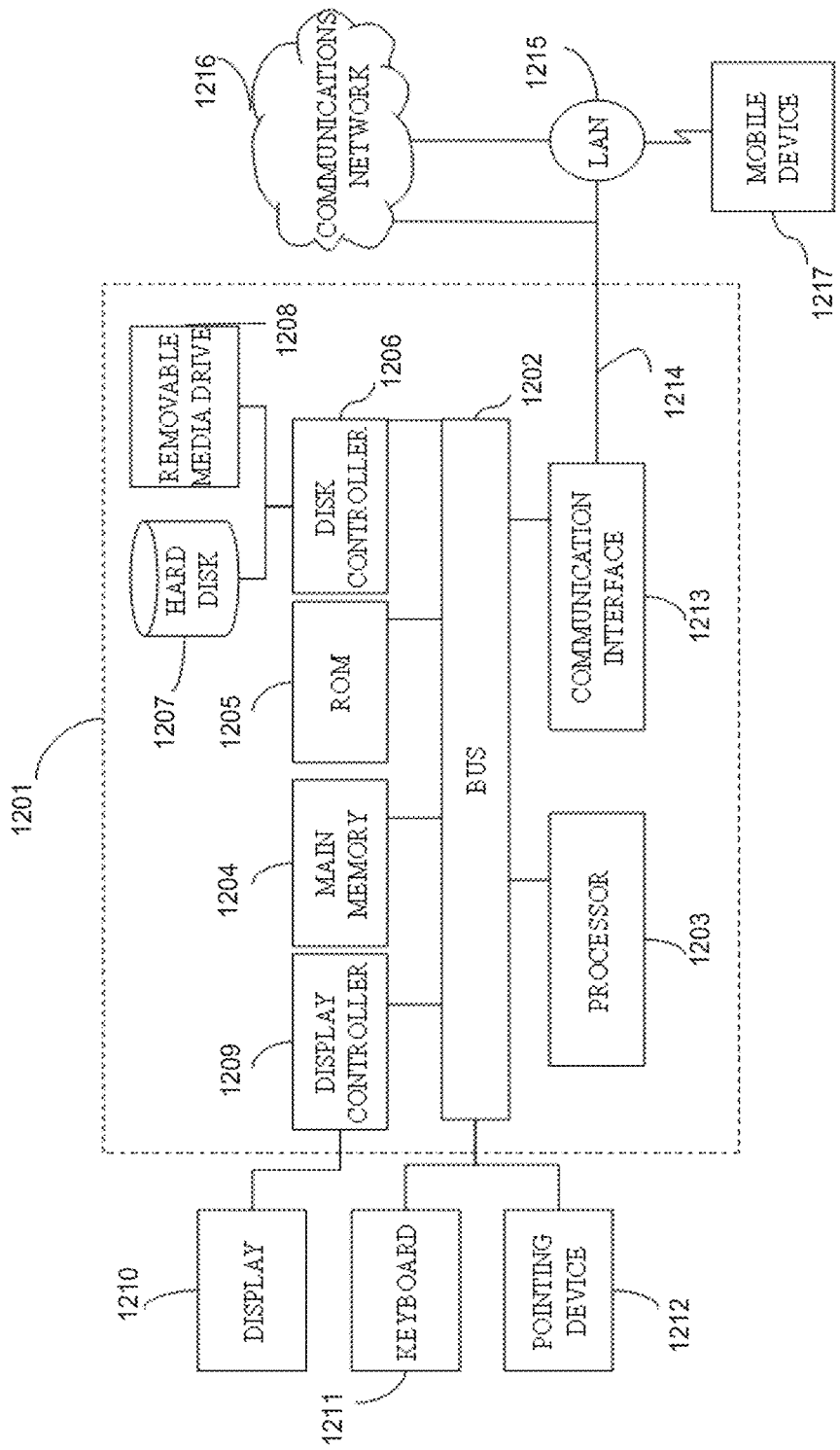
FIG. 12 illustrates a block diagram of a computing device according to one embodiment.

The various features discussed above may be implemented by a computer system (or programmable logic). FIG. 12 illustrates such a computer system 1201. As noted above, each of the devices 101, 107, 108, 109, and 120 may have a configuration as shown in FIG. 12. Further, the computer system 1201 of FIG. 12 may be a general-purpose computer or a particular, special-purpose machine. In one embodiment, the computer system 1201 is a particular, special-purpose machine when the processor 1203 is programmed to perform an authentication of a physical structure such as a building of an organization.

The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, for displaying information to a computer user. The computer system includes input devices, such as a keyboard 1212 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210.

The processor 1203 executes one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing the invention, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

While aspects of the present disclosure have been described in conjunction with the specific embodiments thereof that are proposed as examples, alternatives, modifications, and variations to the examples may be made.

The embodiments are mainly described in terms of particular processes and systems provided in particular implementations. However, the processes and systems will operate effectively in other implementations. Phrases such as "an embodiment", "one embodiment" and "another embodiment" may refer to the same or different embodiments. The embodiments described herein are with respect to methods and compositions having certain components. However, the methods and compositions may include more or less components than those shown, and variations in the arrangement and type of the components may be made without departing from the scope of the present disclosure. Specifically, the methods described herein may include a combination of several embodiments.

Furthermore, the exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown, but is to be accorded the widest scope consistent with the principles and features described herein and as limited only by the appended claims.

It should be noted that, as used in the specification and the appended claims, the singular forms "a," "an," and "the" include plural referents unless the context clearly dictates otherwise. Additionally, the above disclosure also encompasses the embodiments listed below:

(1) A communicating device for performing authentication of a physical structure, the communicating device comprising: circuitry configured to transmit a first instruction to a mobile device via a network, receive, from the mobile device, via the network, first information associated with execution of the first instruction by the mobile device, validate the first information to determine a first score corresponding to the first instruction, by comparing the first information with pre-stored information, transmit a second instruction to the mobile device via the network, receive, from the mobile device, via the network, second information associated with execution of the second instruction by the mobile device, validate the second information to determine a second score corresponding to the second instruction, by comparing the second information with pre-stored information, and generate an authentication result for the physical structure in response to the first score being greater than a first predetermined threshold and the second score being greater than a second predetermined threshold.

(2) The communicating device of (1), wherein the circuitry is further configured to: transmit a third instruction to the mobile device via the network, based on at least one of the first score being less than the first predetermined threshold and the second score being less than the second predetermined threshold.

(3) The communicating device according to (1) or (2), wherein the first threshold and the second threshold are different.

(4) The communication device of (1)-(3), wherein the circuitry is further configured to compute a reliability score for the authentication of the physical structure as a ratio of a sum of the determined scores associated with the execution of the first, second, and third instructions to a sum of a highest score associated with the execution of each instruction.

(5) The communication device of (1), wherein the first instruction is one of capturing an image of the physical structure and capturing a logo corresponding to the physical structure.

(6) The communication device of (2)-(5), wherein the circuitry is further configured to retransmit a modified first instruction based on one of the captured image of the physical structure and the captured image of the logo corresponding to the physical structure having an image quality below a predetermined image quality threshold.

(7) The communicating device of (5) or (6), wherein the second instruction is one of determining an area of the physical structure and determining a number of stories of the physical structure.

(8) The communicating device of (7), wherein the area of the physical structure is determined based on a number of steps taken along a perimeter of the physical structure by an operator of the mobile device, and an average footstep size of the operator, the number of steps being detected by an accelerometer disposed on the mobile device.

(9) The communication device of (7) or (8), wherein the number of stories of the physical structure is computed based on an altitude difference in a single story of the physical structure and a total altitude difference between a top and a bottom of the physical structure, the attitude being determined with reference to a fixed level and being measured by an altimeter that is disposed on the mobile device.

(10) The communication device of (1)-(9), wherein the circuitry is further configured to determine at least one other physical structure that has been previously authenticated, and that is located within a predetermined distance away from the physical structure being authenticated; transmit a third instruction to the mobile device via the network instructing an operator of the mobile device to walk from the physical structure being authenticated to the at least one other physical structure that has been previously authenticated; and receive third information associated with execution of the third instruction by the operator of the mobile device.

(11) The communication device of (10), wherein the third information received by the communication device is a number of steps taken by the operator of the mobile device in travelling from the physical structure being authenticated to the at least one other physical structure that has been previously authenticated, the steps being detected by an accelerometer disposed on the mobile device.

(12) A method of authenticating a physical structure performed by circuitry included in a communication device, the method comprising: transmitting a first instruction to a mobile device via a network; receiving, from the mobile device, via the network, first information associated with execution of the first instruction by the mobile device; validating the first information to determine a first score corresponding to the first instruction, by comparing the first information with pre-stored information; transmitting a second instruction to the mobile device via the network; receiving, from the mobile device, via the network, second information associated with execution of the second instruction by the mobile device; validating the second information to determine a second score corresponding to the second instruction, by comparing the second information with pre-stored information; and generating an authentication result for the physical structure in response to the first score being greater than a first predetermined threshold and the second score being greater than a second predetermined threshold.

(13) The method of (12), further comprising: transmitting a third instruction to the mobile device via the network, based on at least one of the first score being less than the first predetermined threshold and the second score being less than the second predetermined threshold.

(14) The method of (12) or (13), further comprising: computing a reliability score for the authentication of the physical structure as a ratio of a sum of the determined scores associated with the execution of the first, second, and the third instructions to a sum of a highest score associated with the execution of each instruction.

(15) The method of (12), wherein the first instruction is one of capturing an image of the physical structure and capturing a logo corresponding to the physical structure.

(16) The method of (12)-(15), further comprising: retransmitting a modified first instruction based on one of the captured image of the physical structure and the captured image of the logo corresponding to the physical structure having an image quality below a predetermined image quality threshold.

(17) The method of (12)-(16), further comprising: determining at least one other physical structure that has been previously authenticated, and that is located within a predetermined distance away from the physical structure being authenticated; transmitting a third instruction to the mobile device via the network instructing an operator of the mobile device to walk from the physical structure being authenticated to the at least one other physical structure that has been previously authenticated; and receiving third information associated with execution of the third instruction by the operator of the mobile device.

(18) A non-transitory computer readable medium including computer executable instructions, wherein the instructions, when executed by a computer, cause the computer to perform a method of authenticating a physical structure, the method comprising: transmitting a first instruction to a mobile device via a network; receiving, from the mobile device, via the network, first information associated with execution of the first instruction by the mobile device; validating the first information to determine a first score corresponding to the first instruction, by comparing the first information with pre-stored information; transmitting a second instruction to the mobile device via the network; receiving, from the mobile device, via the network, second information associated with execution of the second instruction by the mobile device; validating the second information to determine a second score corresponding to the second instruction, by comparing the second information with pre-stored information; and generating an authentication result for the physical structure in response to the first score being greater than a first predetermined threshold and the second score being greater than a second predetermined threshold.

(19) The non-transitory computer readable medium of (18), the method further comprising: transmitting a third instruction to the mobile device based on at least one of the first score being less than the first predetermined threshold and the second score being less than the second predetermined threshold.

(20) The non-transitory computer readable medium of (18) or (19), the method further comprising: computing a reliability score for the authentication of the physical structure as a ratio of a sum of the determined scores associated with the execution of the first, second, and the third instructions to a sum of a highest score associated with the execution of each instruction.

The invention claimed is:
1. A communicating device for performing authentication of a physical structure, the communicating device comprising:
 circuitry configured to
  transmit a first instruction to a mobile device via a network to perform a first task of validating an identification associated with the physical structure, the first instruction including an instruction to capture a first image of a first aspect of the physical structure,
  receive, from the mobile device and via the network, first information associated with execution of the first instruction by the mobile device, the first information including the first image of the first aspect of the physical structure, transmit, when an image quality of the first image of the first aspect of the physical structure is below a predetermined image quality threshold, a modified first instruction to the mobile device and via the network, the modified first instruction including instructions to capture additional images of the first aspect of the physical structure from different angles, validate, when the image quality of the first image of the first aspect of the physical structure is above the predetermined image quality threshold, the first information by applying image pattern matching to the first image of the first aspect of the physical structure to determine a first score corresponding to the first task, the first score being a numerical value within a predetermined range, the numerical value depending on a degree of similarity between the first image of the first aspect of the physical structure and reference images within a database, transmit a second instruction to the mobile device via the network to perform a second task of validating the identification associated with the physical structure, the second instruction including an instruction to capture an image of a second aspect of the physical structure, receive, from the mobile device and via the network, second information associated with execution of the second instruction by the mobile device, the second information including the image of the second aspect of the physical structure, validate the second information, by applying image pattern matching to the image of the second aspect of the physical structure, to determine a second score corresponding to the second task, the second score being a numerical value within a predetermined range, the numerical value depending on a degree of similarity between the image of the second aspect of the physical structure and reference images within the database, calculate a geometric distance between a first location of the first information and a second location of the second information, verify that the first information and the second information are associated with the physical structure based on the geometric distance, generate a positive authentication result for the physical structure when the first score is greater than a first predetermined threshold value and the second score is greater than a second predetermined threshold value, the first predetermined threshold value being different from the second predetermined threshold value, compute a reliability score of the positive authentication result as a weighted sum $\gamma N+\delta(OS)$, where N is a number of executed instructions performed for the authentication of the physical structure, OS is an overall score associated with execution of the instructions, and $\gamma$ and $\delta$ are corresponding weights assigned to the number of instructions and the overall score OS, respectively, and determine whether to transmit a new instruction to the mobile device based on at least one of the first score and the second score.

2. The communicating device of claim 1, wherein the circuitry is further configured to:

transmit a third instruction to the mobile device via the network based on at least one of the first score being less than the first predetermined threshold value and the second score being less than the second predetermined threshold value.

3. The communication device of claim 2, wherein the circuitry is further configured to compute an additional reliability score as a ratio of a sum of determined scores associated with execution of the first instruction, the second instruction, and the third instruction to a sum of highest possible scores associated with execution of each instruction.

4. The communication device of claim 1, wherein the identification associated with the physical structure includes a sign.

5. The communicating device of claim 1, wherein the second task of validating the identification associated with the physical structure includes determining an area of the physical structure and determining a number of stories of the physical structure.

6. The communicating device of claim 5, wherein the area of the physical structure is determined based on a number of steps taken along a perimeter of the physical structure by an operator of the mobile device and an average footstep size of the operator, the number of steps being detected by an accelerometer disposed on the mobile device.

7. The communication device of claim 5, wherein the number of stories of the physical structure is computed based on an altitude difference in a single story of the physical structure and a total altitude difference between a top and a bottom of the physical structure, altitude being determined with reference to a fixed level and being measured by an altimeter that is disposed on the mobile device.

8. The communication device of claim 4, wherein the circuitry is further configured to determine at least one other physical structure that has been previously authenticated and that is located within a predetermined distance away from the physical structure being authenticated;

transmit a third instruction to the mobile device via the network instructing an operator of the mobile device to walk from the physical structure being authenticated to the at least one other physical structure that has been previously authenticated; and receive third information associated with execution of the third instruction by the operator of the mobile device.

9. The communication device of claim 8, wherein the third information received by the communication device is a number of steps taken by the operator of the mobile device in travelling from the physical structure being authenticated to the at least one other physical structure that has been previously authenticated, the number of steps being detected by an accelerometer disposed on the mobile device.

10. A method of authenticating a physical structure performed by circuitry included in a communication device, the method comprising:

transmitting a first instruction to a mobile device via a network to perform a first task of validating an identification associated with the physical structure, the first instruction including an instruction to capture a first image of a first aspect of the physical structure;

receiving, from the mobile device and via the network, first information associated with execution of the first instruction by the mobile device, the first information including the first image of the first aspect of the physical structure;

transmitting, when an image quality of the first image of the first aspect of the physical structure is below a predetermined image quality threshold, a modified first instruction to the mobile device and via the network, the modified first instruction including instructions to capture additional images of the first aspect of the physical structure from different angles;

calculating a geometric distance between a first location of the first information and a second location of the second information;

verifying that the first information and the second information are associated with the physical structure based on the geometric distance;

validating, when the image quality of the first image of the first aspect of the physical structure is above the predetermined image quality threshold, the first information, by applying image pattern matching to the first image of the first aspect of the physical structure, to determine a first score corresponding to the first task, the first score being a numerical value within a predetermined range, the numerical value depending on a degree of similarity between the first image of the first aspect of the physical structure and reference images within a database;

transmitting a second instruction to the mobile device via the network to perform a second task of validating the identification associated with the physical structure, the second instruction including an instruction to capture an image of a second aspect of the physical structure;

receiving, from the mobile device and via the network, second information associated with execution of the second instruction by the mobile device, the second information including the image of the second aspect of the physical structure;

validating the second information, by applying image pattern matching to the image of the second aspect of the physical structure, to determine a second score corresponding to the second task, the second score being a numerical value within a predetermined range, the numerical value depending on a degree of similarity between the image of the second aspect of the physical structure and reference images within the database;

generating a positive authentication result for the physical structure when the first score is greater than a first predetermined threshold value and the second score is greater than a second predetermined threshold value, the first predetermined threshold value being different from the second predetermined threshold value;

computing a reliability score of the positive authentication result as a weighted sum $\gamma N + \delta(OS)$, where N is a number of executed instructions performed for the authentication of the physical structure, OS is an overall score associated with execution of the instructions, and $\gamma$ and $\delta$ are corresponding weights assigned to the number of instructions and the overall score OS, respectively; and determining whether to transmit a new instruction to the mobile device based on at least one of the first score and the second score.

11. The method of claim 10, further comprising:
transmitting a third instruction to the mobile device via the network based on at least one of the first score being less than the first predetermined threshold value and the second score being less than the second predetermined threshold value.

12. The method of claim 11, further comprising:
computing an additional reliability score for the authentication of the physical structure as a ratio of a sum of determined scores associated with execution of the first instruction, the second instruction, and the third instruction to a sum of highest possible scores associated with execution of each instruction.

13. The method of claim 10, wherein the identification associated with the physical structure includes a sign.

14. The method of claim 12, further comprising:
determining at least one other physical structure that has been previously authenticated and that is located within a predetermined distance away from the physical structure being authenticated;

transmitting a third instruction to the mobile device via the network instructing an operator of the mobile device to walk from the physical structure being authenticated to the at least one other physical structure that has been previously authenticated; and receiving third information associated with execution of the third instruction by the operator of the mobile device.

15. A non-transitory computer readable medium including computer executable instructions, wherein the instructions, when executed by a computer, cause the computer to perform a method of authenticating a physical structure, the method comprising:

transmitting a first instruction to a mobile device via a network to perform a first task of validating an identification associated with the physical structure, the first instruction including an instruction to capture a first image of a first aspect of the physical structure;

receiving, from the mobile device and via the network, first information associated with execution of the first instruction by the mobile device, the first information including the first image of the first aspect of the physical structure;

transmitting, when an image quality of the first image of the first aspect of the physical structure is below a predetermined image quality threshold, a modified first instruction to the mobile device and via the network, the modified first instruction including instructions to capture additional images of the first aspect of the physical structure from different angles;

calculating a geometric distance between a first location of the first information and a second location of the second information;

verifying that the first information and the second information are associated with the physical structure based on the geometric distance;

validating, when the image quality of the first image of the first aspect of the physical structure is above the predetermined image quality threshold, the first information, by applying image pattern matching to the first image of the first aspect of the physical structure, to determine a first score corresponding to the first task, the first score being a numerical value within a predetermined range, the numerical value depending on a degree of similarity between the first image of the first aspect of the physical structure and reference images within a database;

transmitting a second instruction to the mobile device via the network to perform a second task of validating the identification associated with the physical structure, the second instruction including an instruction to capture an image of a second aspect of the physical structure;

receiving, from the mobile device and via the network, second information associated with execution of the second instruction by the mobile device, the second information including the image of the second aspect of the physical structure;

validating the second information, by applying image pattern matching to the image of the second aspect of the physical structure, to determine a second score corresponding to the second task, the second score being a numerical value within a predetermined range, the numerical value depending on a degree of similarity between the image of the second aspect of the physical structure and reference images within the database;

generating a positive authentication result for the physical structure when the first score is greater than a first predetermined threshold and the second score is greater than a second predetermined threshold value, the first predetermined threshold being different from the second predetermined threshold value;

computing a reliability score of the positive authentication result as a weighted sum $\gamma N+\delta(OS)$, where N is a number of executed instructions performed for the authentication of the physical structure, OS is an overall score associated with execution of the instructions, and $\gamma$ and $\delta$ are corresponding weights assigned to the number of instructions and the overall score OS, respectively; and determining whether to transmit a new instruction to the mobile device based on at least one of the first score and the second score.

16. The non-transitory computer readable medium of claim 15, the method further comprising:

transmitting a third instruction to the mobile device based on at least one of the first score being less than the first predetermined threshold value and the second score being less than the second predetermined threshold value.

17. The non-transitory computer readable medium of claim 16, the method further comprising:

computing an additional reliability score as a ratio of a sum of determined scores associated with execution of the first instruction, the second instruction, and the third instruction to a sum of highest possible scores associated with execution of each instruction.

18. The communicating device of claim 1, wherein the circuitry is further configured to generate a zone of confidence based on an accuracy of geographic information from the mobile device.

19. The communicating device of claim 18, wherein the circuitry is further configured to generate a visualization of the geographic information and the zone of confidence.

20. The communicating device of claim 1, wherein the circuitry is configured to verify that the first information and the second information are associated with the physical structure by comparing the geometric distance with a threshold distance.

* * * * *